United States Patent
Sakai et al.

(10) Patent No.: US 7,522,684 B2
(45) Date of Patent: Apr. 21, 2009

(54) SIGNAL TRANSMISSION SYSTEM

(75) Inventors: Kazuhiro Sakai, Ashigarakami-gun (JP); Kazuhiro Suzuki, Ashigarakami-gun (JP); Tomo Baba, Ashigarakami-gun (JP); Tsutomu Hamada, Ashigarakami-gun (JP); Shinobu Ozeki, Ashigarakami-gun (JP); Masaru Kijima, Ashigarakami-gun (JP); Masaaki Miura, Ashigarakami-gun (JP); Takeshi Kamimura, Minamiashigara (JP); Yoshihide Sato, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 695 days.

(21) Appl. No.: 10/397,432

(22) Filed: Mar. 27, 2003

(65) Prior Publication Data

US 2004/0052321 A1  Mar. 18, 2004

(30) Foreign Application Priority Data

Sep. 17, 2002  (JP)  ............................. 2002-270427

(51) Int. Cl.
*H04L 27/00* (2006.01)
*H04L 7/00* (2006.01)

(52) U.S. Cl. ................. 375/354; 375/355; 375/356; 375/358; 375/295

(58) Field of Classification Search ................. 375/354, 375/355, 356, 358, 295, 316
See application file for complete search history.

(56) References Cited

U.S. PATENT DOCUMENTS

| | | | |
|---|---|---|---|
| 5,455,831 A * | 10/1995 | Bartow et al. ............... | 714/700 |
| 5,526,297 A * | 6/1996 | Snyder et al. ............... | 708/212 |
| 5,740,210 A | 4/1998 | Rokugawa | |
| 5,952,857 A * | 9/1999 | Suzuki ....................... | 327/149 |
| 6,166,572 A * | 12/2000 | Yamaoka .................... | 327/149 |
| 6,178,212 B1 * | 1/2001 | Akashi ....................... | 375/355 |
| 6,292,521 B1 * | 9/2001 | Lai et al. ..................... | 375/357 |
| 6,336,192 B1 | 1/2002 | Sakamoto et al. | |
| 6,557,110 B2 | 4/2003 | Sakamoto et al. | |
| 6,603,706 B1 * | 8/2003 | Nystuen et al. ............. | 365/233 |
| 6,930,932 B2 * | 8/2005 | Rentschler .................. | 365/193 |
| 7,039,323 B2 * | 5/2006 | Jong et al. .................. | 398/155 |
| 2002/0196883 A1 * | 12/2002 | Best et al. ................... | 375/355 |

(Continued)

FOREIGN PATENT DOCUMENTS

JP  A-05-037580  2/1993

(Continued)

*Primary Examiner*—Chieh M Fan
*Assistant Examiner*—Jason M. Perilla
(74) *Attorney, Agent, or Firm*—Oliff & Berridge, PLC

(57) ABSTRACT

For signals to be transmitted through a signal transmission path constituted by a relay device group for relay for each set of a plurality of channels, a timing adjustment unit is provided in both or one of a receiver-side LSI and a transmitter-side LSI for each set of a plurality of channels transmitted through the relay device group for relay so that the signals can be transmitted with accurate timing. In addition, the timing adjustment unit can adjust the timing for signals transmitted through each relay device group, the timing in one receiver-side LSI in signal transmission through a plurality of relay device groups, and the timing in one-to-many signal transmission in which signals are transmitted from one transmitter-side LSI to a plurality of receiver-side LSIs.

5 Claims, 19 Drawing Sheets

U.S. PATENT DOCUMENTS

2003/0043926 A1 * 3/2003 Terashima et al. .......... 375/257

FOREIGN PATENT DOCUMENTS

| | | |
|---|---|---|
| JP | A 5-37580 | 2/1993 |
| JP | A-05-110550 | 4/1993 |
| JP | A-06-224962 | 8/1994 |
| JP | A 6-224962 | 8/1994 |
| JP | A-09-284265 | 10/1997 |
| JP | A-10-164037 | 6/1998 |
| JP | A-11-112483 | 4/1999 |
| JP | A-11-177540 | 7/1999 |
| JP | A-11-341102 | 12/1999 |
| JP | A 11-341102 | 12/1999 |
| JP | A 2000-201105 | 7/2000 |
| JP | 2002-330120 | 11/2002 |

* cited by examiner

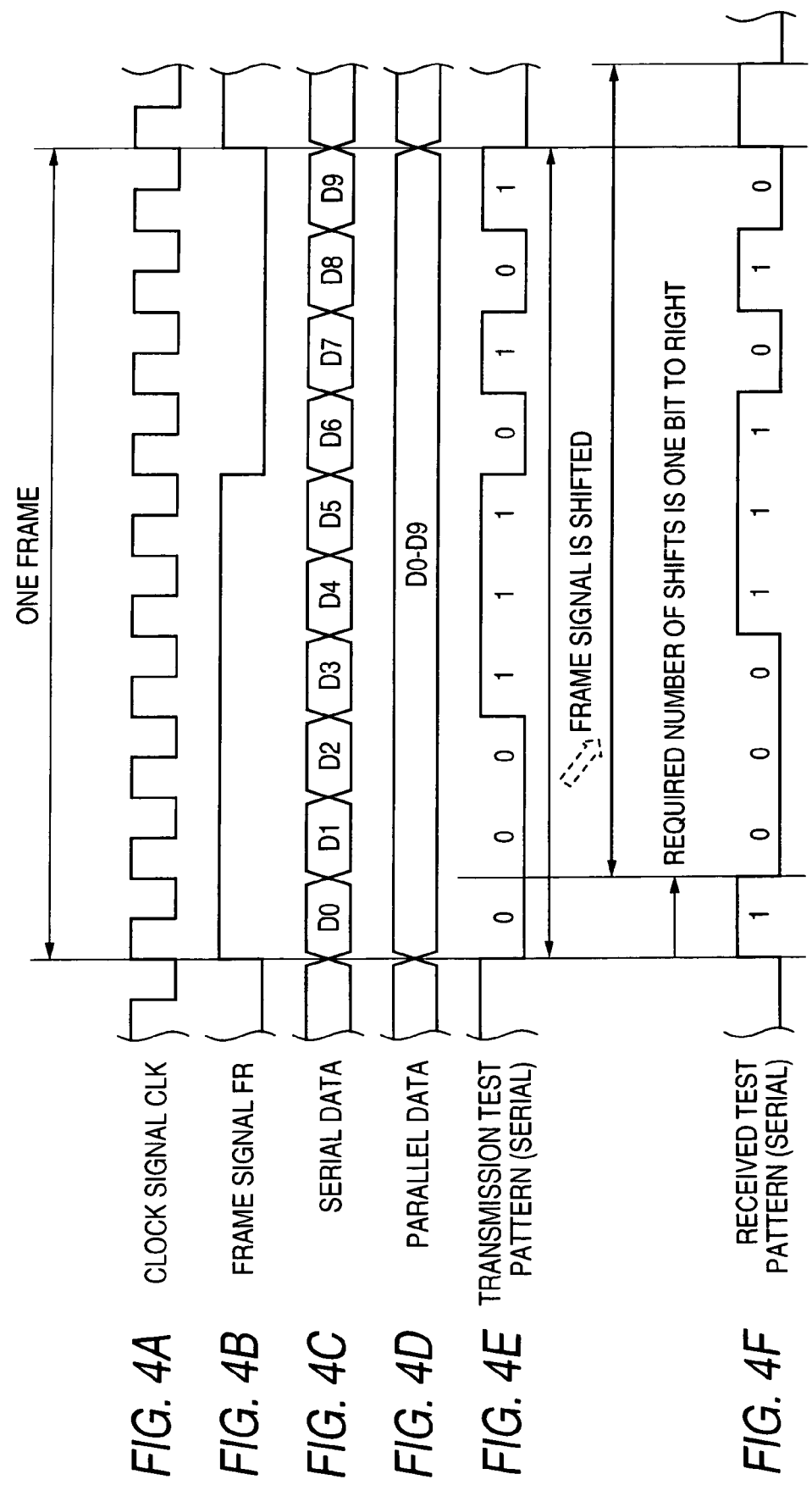

FIG. 7A

TEST PATTERN
(SETTING)

BIT SEQUENCE 1   "0001110101"

FIG. 7B

TEST PATTERN
(EXAMPLE OF RECEPTION)

BIT SEQUENCE 2   "1000111010"

FIG. 7C

| VARIATION OF RECEPTION (TRANSMISSION) TIMING | RESULT 1: JUDGMENT OF RECEPTION (TRANSMISSION) OF ALL BITS | RESULT 2: NUMBER OF REQUIRED SHIFTS | OPTIMAL RECEPTION (TRANSMISSION) TIMING |
|---|---|---|---|
| TIMING 1 | NG | – | |
| TIMING 2 | NG | – | |
| TIMING 3 | OK | 1 BIT TO RIGHT | |
| TIMING 4 | OK | 1 BIT TO RIGHT | |
| TIMING 5 | OK | 1 BIT TO RIGHT | |
| TIMING 6 | OK | 1 BIT TO RIGHT | |
| TIMING 7 | OK | 1 BIT TO RIGHT | |
| TIMING 8 | NG | – | |
| TIMING 9 | NG | – | |
| TIMING 10 | NG | – | |
| TIMING 11 | OK | 0 | |
| TIMING 12 | OK | 0 | |
| TIMING 13 | OK | 0 | O |
| TIMING 14 | OK | 0 | |
| TIMING 15 | OK | 0 | |
| TIMING 16 | NG | – | |
| TIMING 17 | NG | – | |
| TIMING 18 | NG | – | |
| TIMING 19 | OK | 1 BIT TO LEFT | |
| TIMING 20 | OK | 1 BIT TO LEFT | |
| TIMING 21 | OK | 1 BIT TO LEFT | |
| TIMING 22 | OK | 1 BIT TO LEFT | |
| TIMING 23 | OK | 1 BIT TO LEFT | |
| TIMING 24 | NG | – | |

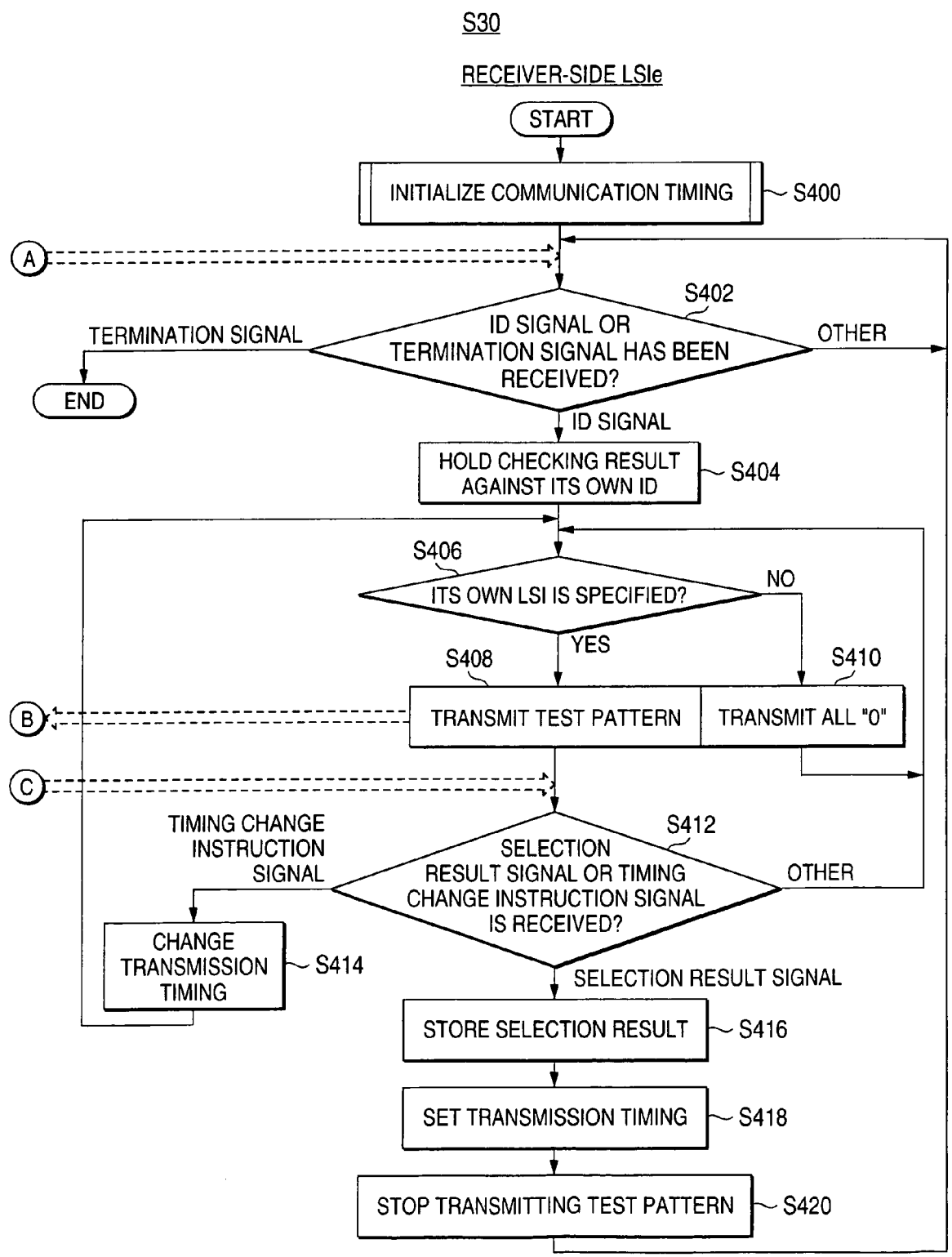

SIGNAL TRANSMISSION SYSTEM

CROSS REFERENCE OF RELATED APPLICATION

This application is based on and claims priority under 35 U.S.C. § 119 with respect to Japanese Patent Application No. 2002-270427 filed on Sep. 17, 2002, the entire content of which is incorporated herein by reference.

BACKGROUND OF THE INVENTION

1. Field of the Invention

The present invention relates to a signal transmission system for transmitting a signal with transmission timing adjusted.

2. Description of the Related Art

In a high-speed signal transmission system, transmission skew may be produced among a plurality of signals transmitted.

In order to suppress transmission skew among signals, it is known that an adjustment circuit for establishing synchronization is provided for each signal. (See Documents 1 to 4)

[Document 1] JP-A-5-37580
[Document 2] JP-A-11-341102
[Document 3] JP-A-6-224962
[Document 4] JP-A-2000-201105

However, in the signal transmission system in which an adjustment circuit for establishing synchronization is provided for each signal, it is necessary to provide the adjustment circuits in accordance with the number of signals. Thus, the circuit configuration may be complicated or made large in scale, or the system may be expensive.

SUMMARY OF THE INVENTION

The invention was developed in consideration of the aforementioned situation. It is an object of the invention to provide a signal transmission system in which signal transmission can be performed with accurate timing by an adjustment circuit for establishing synchronization not for each signal but for each relay device for relaying signal transmission.

In order to achieve the object, according to the invention, there is provided a signal transmission system including a transmitter transmitting at least one transmission signal as a subject of transmission and a synchronization signal synchronous with the transmission signal; a relay device relaying the transmitted transmission signal and the transmitted synchronization signal; and a receiver of the relayed transmission signal and the relayed synchronization signal; wherein the receiver including a holding circuit of the received transmission signal synchronously with a second synchronization signal; and a first timing adjustment unit receiving the synchronization signal and outputting the second synchronization signal generated from the received synchronization signal by delaying the received synchronization signal so that the received transmission signal can be held to have a correct value by the holding circuit.

Preferably, the transmitter transmits a predetermined test pattern as the transmission signal, and the first timing adjustment unit of the receiver having a memory of information regarding a received state of the received test pattern and adjusting output timing of the second synchronization signal based on the information.

Preferably, the first timing adjustment unit includes a delay circuit of delaying the received synchronization signal and clock regenerating circuit receiving the delayed synchronization signal and outputting a clock signal regenerated from the delayed synchronization signal as the second synchronization signal to the holding circuit.

Preferably, the signal transmission system according to the invention further includes a plurality of relay devices including the relay device and similar thereto, wherein the holding circuit holds each of the transmission signals received from the plurality of relay devices synchronously with each of the second synchronization signals being adjusted based on the received synchronization signal from the plurality of relay devices; and the first timing adjustment unit adjusts output timing of each of the synchronization signals received from the plurality of relay devices so that each of the transmission signals received from the plurality of relay devices can be held to have a correct value by each of the holding circuits.

According to the invention, there is provided a signal transmission system including a transmitter transmitting at least one transmission signal as a subject of transmission and a synchronization signal synchronous with the transmission signal; a relay device relaying the transmitted transmission signal and the transmitted synchronization signal; and a receiver of the relayed transmission signal and the relayed synchronization signal; the receiver including: a second synchronization signal output circuit receiving the relayed synchronization signal and outputting the second synchronization signal according to the received synchronization signal; a holding circuit of the received transmission signal synchronously with the second synchronization signal; and a notification circuit outputting a notice to the transmitter as to whether the received transmission signal has been held to have a correct value or not, wherein the transmitter including a second timing adjustment unit adjusting a transmission timing of the transmission signal and the synchronization signal to be transmitted from the transmitter, based on the notice from the notification circuit, so that the received transmission signal can be held to have a correct value by the holding circuit.

Preferably, the transmitter further includes a test pattern transmitting unit transmitting a predetermined test pattern as the transmission signal; and the receiver further includes a first timing adjustment unit giving a notice to the transmitter via the notification circuit as to whether the test pattern received as the transmission signal has been held to have a correct value or not.

Preferably, the signal transmission system according to the invention further includes a plurality of relay devices including the relay device and similar thereto, wherein the receiver receives the relayed transmission signal and the relayed synchronization signal from each of the plurality of relay devices; the holding circuits holds each of the transmission signals received from the plurality of relay devices synchronously with each of the second synchronization signals being adjusted based on each synchronization signal received from the plurality of relay devices; the notification circuit gives a notice to the transmitter as to whether each of the transmission signals received from the plurality of relay devices has been held to have a correct value or not; and the second timing adjustment unit adjusts the transmission timing of the transmission signals and the synchronization signals transmitted via the plurality of relay devices, with each of the plurality of relay devices, based on the notice from the notification circuit so that each of the transmission signals received from the plurality of relay devices can be held to have a correct value.

BRIEF DESCRIPTION OF THE DRAWINGS

These and other objects and advantages of this invention will become more fully apparent from the following detailed description taken with the accompanying drawings in which:

FIGS. 4A to 4F are diagrams showing the relationship among signals with respect to one transmission frame, FIG. 4A showing a clock signal CLK, FIG. 4B showing a frame signal FR, FIG. 4C showing 10-bit serial data, FIG. 4D showing an example of parallel data, FIG. 4E showing an example of a transmission test pattern to be transmitted when transmission timing is tested, FIG. 4F showing an example of a reception test pattern received when the transmission timing is tested;

FIGS. 7A to 7C are diagrams showing an example of a test pattern used for the timing adjustment and an example of the test results, FIG. 7A showing an example of a transmitted test pattern (bit sequence 1), FIG. 7B showing an example of reception (bit sequence 2) obtained by receiving the bit sequence 1, FIG. 7C being a table showing an example of the results of receiving the test pattern in 24 kinds of different timings with the delay of the frame signal FR varied continuously;

FIG. 19 is a flow chart showing a transmission adjustment sequence (on the receiver-side LSI e side) of the receiver-side LSI e.

DETAILED DESCRIPTION OF THE PREFERRED EMBODIMENTS

Now, a description will be given in more detail of preferred embodiments of the present invention with reference to the accompanying drawings.

Figure 1:
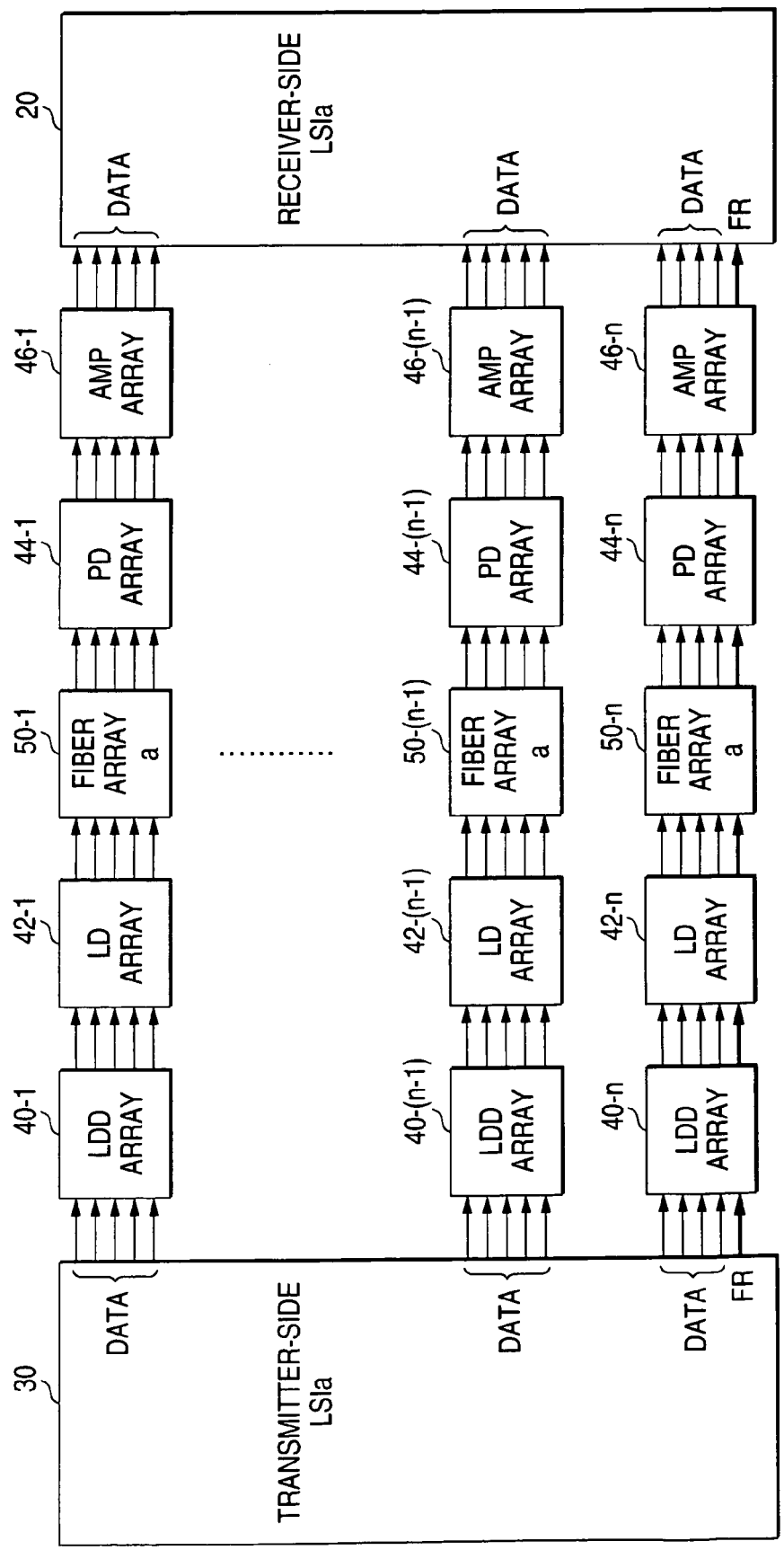
FIG. 1 is a diagram showing the configuration of a signal transmission system according to the invention.

FIG. 1 is a diagram showing the configuration of a signal transmission system 1 according to the invention.

As shown in FIG. 1, the signal transmission system 1 is, for example, an optical signal transmission system, which is constituted by a receiver-side LSI a 20, a transmitter-side LSI a 30, n laser diode drive circuit arrays (LDD arrays) 40-1 to 40-n (n is an integer), n laser diode arrays (LD arrays) 42-1 to 42-n, n photodiode arrays (PD arrays) 44-1 to 44-n, n amplifier arrays (AMP arrays) 46-1 to 46-n and n fiber arrays a 50-1 to 50-n.

For example, in each of the LDD arrays 40, the LD arrays 42, the fiber arrays a 50, the PD arrays 44 and the AMP arrays 46, five components having a corresponding function are provided in parallel.

Of a plurality of signals transmitted from the transmitter-side LSI a 30 to the receiver-side LSI a 20, for example, one of the signals relayed by the n-th LDD array 40-n, the n-th LD array 42-n, the n-th fiber array a 50-n, the n-th PD-array 44-n and the n-th AMP array 46-n is a frame signal FR (which will be described later with reference to FIGS. 4A to 4F and FIGS. 5A to 5C) used for synchronizing transmission signals.

The portion where the n-th LDD array 40-n, the n-th LD array 42-n, the n-th fiber array a 50-n, the n-th PD-array 44-n and the n-th AMP array 46-n are disposed in that order to relay a signal transmission path connecting the transmitter-side LSI a 30 and the receiver-side LSI a 20 so as to form a 5-channel optical signal transmission path will be hereinafter simply referred to as an n-th relay device group in a lump, or will be simply abbreviated to "relay device group" if the order is not specified.

In addition, any one of a plurality of constituent parts such as the LDD arrays 40-1 to 40-n will be simply referred to as an LDD array 40 if the order is not specified.

Figure 2:
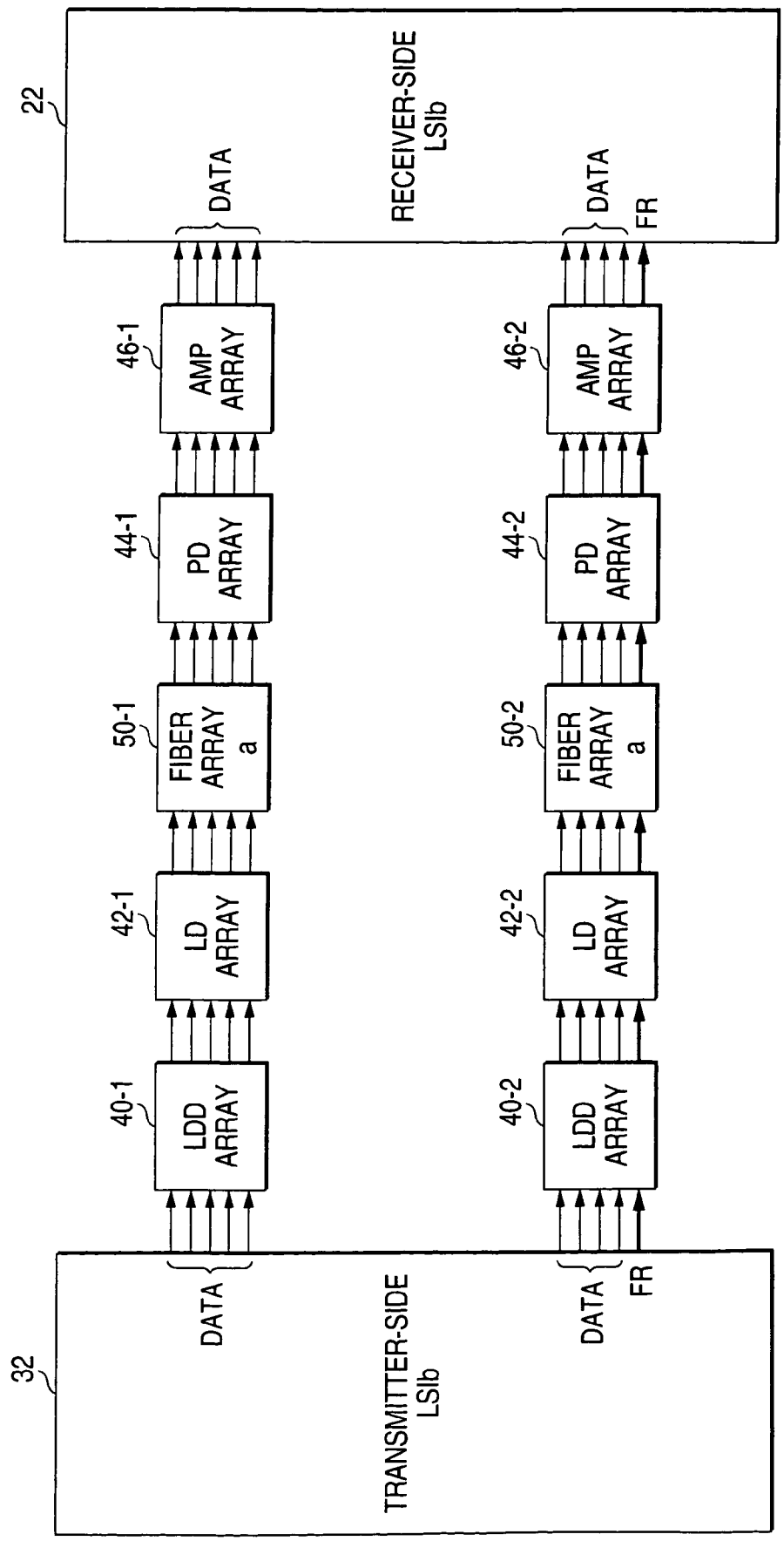
FIG. 2 is a diagram showing a specific example when the number of LDD arrays, the number of LD arrays, the number of PD arrays, the number of AMP arrays and the number of fiber arrays a are 2 (n=2) respectively in the signal transmission system shown in FIG. 1.

FIG. 2 is a diagram showing a specific example of the signal transmission system 1 shown in FIG. 1, in which the numbers of the LDD arrays 40, the LD arrays 42, the PD arrays 44, the AMP arrays 46 and the fiber arrays a 50 are set at 2 (n=2) respectively.

Incidentally, in order to give shape to description and make it easy to understand the invention, the description will be made on a specific example where the signal transmission system 1 includes two LDD arrays 40, two LD arrays 42, two PD arrays 44, two AMP arrays 46 and two fiber arrays a 50 as shown in FIG. 2.

Of signals transmitted from a transmitter-side LSI b 32 to a receiver-side LSI b 22, one of the signals transmitted through the second relay device group is a frame signal FR (see FIG. 4B).

(Receiver-side LSI b 22)

Figure 3:
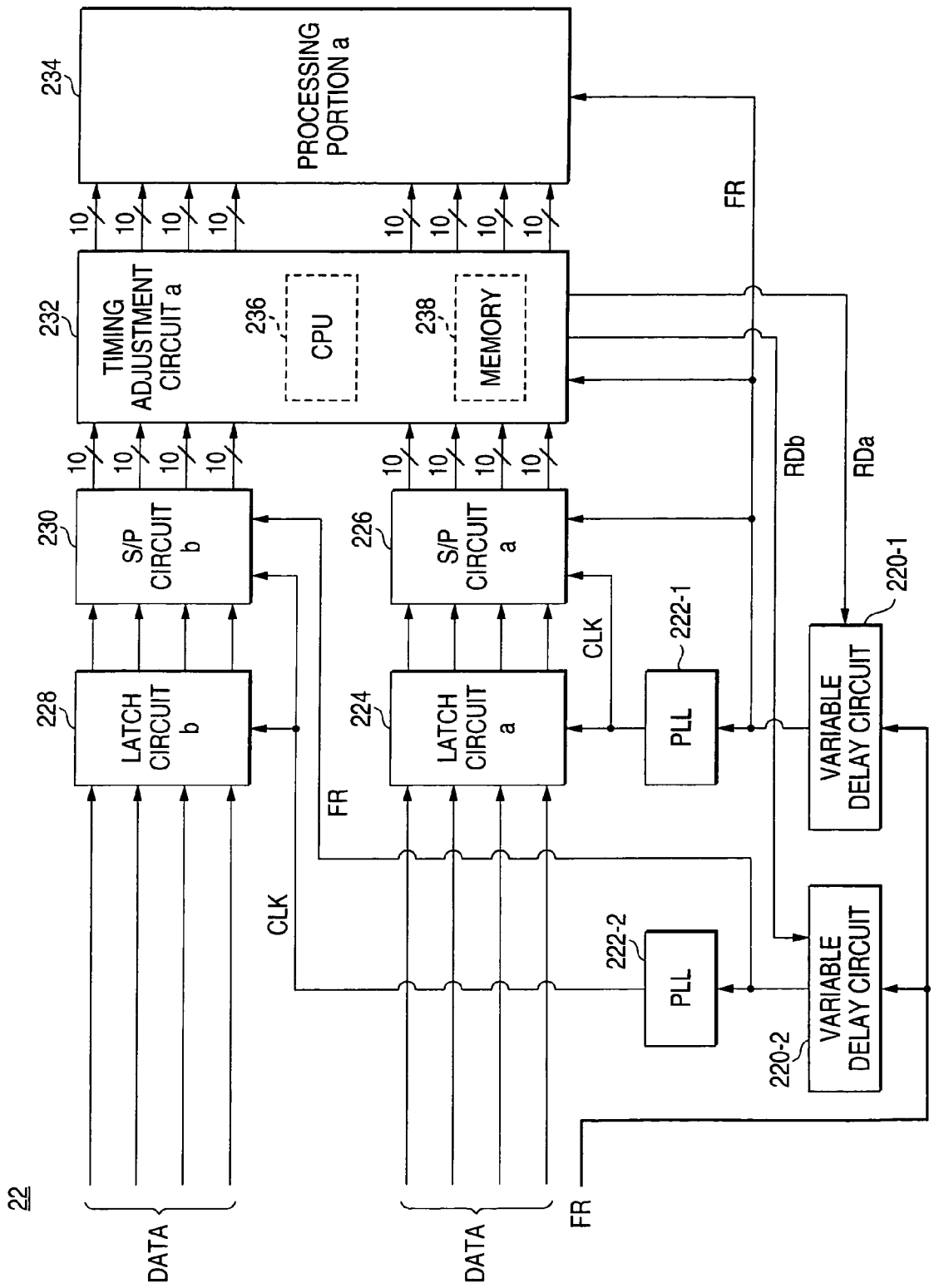
FIG. 3 is a diagram showing the configuration of a receiver-side LSI b shown in FIG. 2.

FIG. 3 is a diagram showing the configuration of the receiver-side LSI b 22 shown in FIG. 2.

FIGS. 4A to 4F are diagrams showing the relationship among signals with respect to one transmission frame. FIG. 4A shows a clock signal CLK. FIG. 4B shows a frame signal FR. FIG. 4C shows 10-bit serial data. FIG. 4D shows an example of parallel data. FIG. 4E shows an example of a transmission test pattern transmitted for testing transmission timing. FIG. 4F shows an example of a reception test pattern received for testing transmission timing.

As shown in FIG. 3, the receiver-side LSI b 22 is, for example, constituted by variable delay circuits 220-1 and 220-2, PLLs 222-1 and 222-2, a 4-channel latch circuit a 224, a 4-input serial-to-parallel conversion circuit (S/P circuit) a 226, a 5-channel latch circuit b 228, a 5-input serial-to-parallel conversion circuit (S/P circuit) b 230, a timing adjustment circuit a 232 and a processing portion a 234. The variable delay circuits 220-1 and 220-2 change the delay of the frame signal FR. The PLLs 222-1 and 222-2 multiply the delayed frame signal FR so as to generate the clock signal CLK.

(Variable Delay Circuit 220-1)

The variable delay circuit 220-1 is controlled by a reception delay instruction signal RDa supplied from the timing adjustment circuit a 232, so as to delay the frame signal FR supplied from the transmitter-side LSI b 32 (FIG. 2) through the second relay device group (See FIGS. 4E and 4F).

The frame signal FR delayed by the reception delay instruction signal RDa is supplied to the PLL 222-1, the S/P circuit a 226, the timing adjustment circuit a 232 and the processing portion a 234 by the variable delay circuit 220-1.

(Variable Delay Circuit 220-2)

The variable delay circuit 220-2 is controlled by a reception delay instruction signal RDb supplied from the timing adjustment circuit a 232, so as to delay the frame signal FR supplied from the transmitter-side LSI b 32 (FIG. 2) through the second relay device group (See FIGS. 4E and 4F).

The frame signal FR delayed by the reception delay instruction signal RDb is supplied to the PLL 222-2 and the S/P circuit b 230 by the variable delay circuit 220-2.

(PLL 222-1)

The PLL 222-1 multiplies the frame signal FR supplied from the variable delay circuit 220-1 so as to decuple the frequency thereof. The frame signal FR is supplied to the latch circuit a 224, the S/P circuit a 226 and the timing adjustment circuit a 232 (See FIGS. 4A and 4B).

(PLL 222-2)

The PLL 222-2 multiplies the frame signal FR supplied from the variable delay circuit 220-2 so as to decuple the frequency thereof. The frame signal FR is supplied to the latch circuit b 228 and the S/P circuit b 230 (See FIGS. 4A and 4B).

(Latch Circuit a 224)

The latch circuit a 224 includes four D-flip-flops (D-F/F; not shown), latching 4-channel serial data signals DATA supplied from the transmitter-side LSI b 32 (FIG. 2) through the second relay device group in accordance with the clock signal CLK supplied from the PLL 222-1. The 4-channel serial data signals DATA are supplied to the S/P circuit a 226.

(S/P Circuit a 226)

The S/P circuit a 226 converts the 4-channel serial data signals DATA supplied from the latch circuit a 224 into 10-bit parallel data respectively by use of the frame signal FR supplied from the variable delay circuit 220-1 and the clock signal CLK supplied from the PLL 222-1. The 10-bit parallel data is supplied to the timing adjustment circuit a 232 (See FIGS. 4C and 4D).

(Latch Circuit b 228)

The latch circuit b 228 includes five D-flip-flops (D-F/F; not shown), latching 5-channel serial data signals DATA supplied from the transmitter-side LSI b 32 (FIG. 2) through the first relay device group in accordance with the clock signal CLK supplied from the PLL 222-2. The 5-channel serial data signals DATA are supplied to the S/P circuit b 230.

(S/P Circuit b 230)

The S/P circuit b 230 converts the 5-channel serial data signals DATA supplied from the latch circuit b 228 into 10-bit parallel data respectively by use of the frame signal FR supplied from the variable delay circuit 220-2 and the clock signal CLK supplied from the PLL 222-2. The 10-bit parallel data is supplied to the timing adjustment circuit a 232 (See FIGS. 4C and 4D).

(Timing Adjustment Circuit a 232)

The timing adjustment circuit a 232 includes a CPU 236, a memory 238 and so on, operating synchronously with the frame signal FR supplied from the variable delay circuit 220-1, accepting the parallel data from the S/P circuit a 226 and the S/P circuit b 230, and supplying given parallel data to the processing portion a 234.

The timing adjustment circuit a 232 further detects a lag in reception timing between the parallel data supplied from the S/P circuit a 226 and the S/P circuit b 230 and the frame signal FR supplied from the transmitter-side LSI b 32 (FIG. 2) through the second relay device group, and supplies the reception delay instruction signals RDa and RDb to the variable delay circuits 220-1 and 220-2 respectively so as to adjust the reception timing for signals transmitted through each relay device group.

Figure 5A:
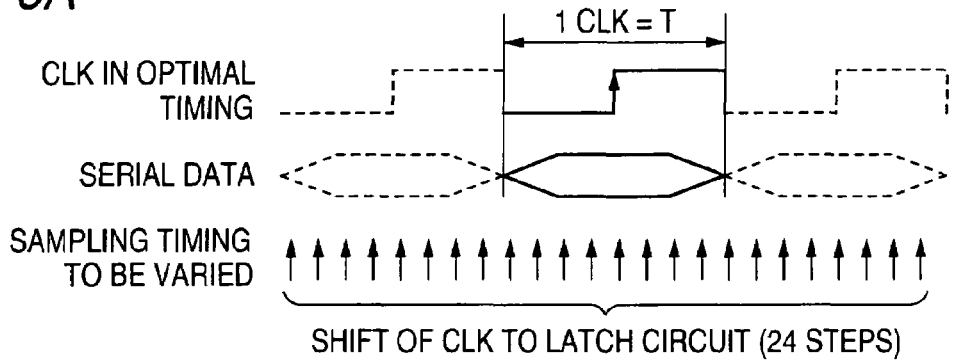
FIGS. 5A to 5C are diagrams showing an example of the clock signal CLK and an example of the frame signal FR with timing varied by a variable delay circuit, FIG. 5A showing the timing with which a latch circuit a latches data signals DATA, FIG. 5B showing the bit error rate (BER) in FIG. 5A, where the abscissa designates the timing of sampling and the ordinate designates the BER, FIG. 5C showing the change of the timing of the frame signal FR with respect to the 10-bit parallel data.
Figure 5B:
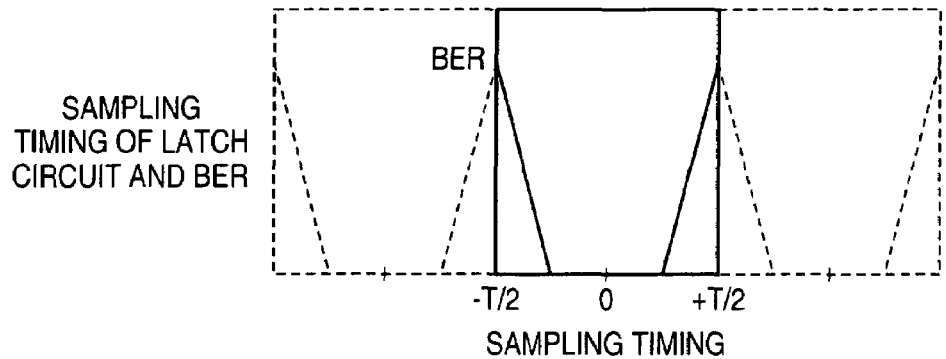
Figure 5C:
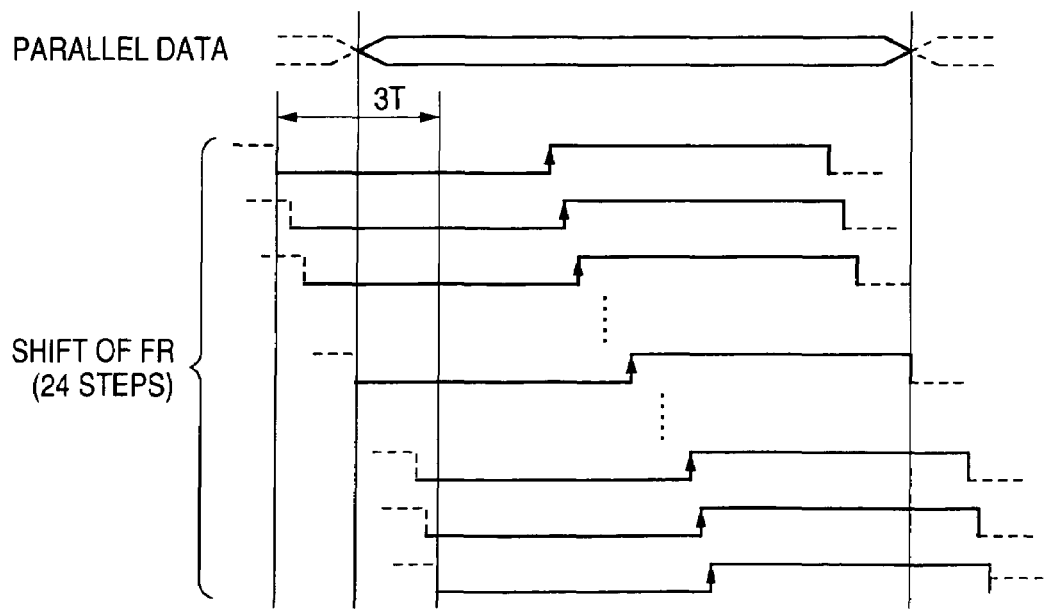

FIGS. 5A to 5C are diagrams showing examples of the clock signal CLK and the frame signal FR with their timing changed by the variable delay circuit 220. FIG. 5A shows the timing with which the latch circuit 224 latches the data signals DATA. FIG. 5B shows the bit error rate (BER) in FIG. 5A. In FIG. 5B, the abscissa designates the timing of sampling and the ordinate designates the BER. FIG. 5C shows the change of the timing of the frame signal FR with respect to the 10-bit parallel data.

For example, the timing adjustment circuit a 232 changes the timing of the clock signal CLK through the reception delay instruction signals RDa and RDb continuously in 24 steps (FIG. 5A) each corresponding to the delay equal to ⅛ of the period (T) of the clock signal CLK. The latch circuit a 224 and the latch circuit b 228 perform data sampling in accordance with the changed timing of the clock signal CLK supplied thereto through the variable delay circuits 220-1 and 220-2 and the PLLs 222-1 and 222-2.

As shown in FIG. 5B, the probability that data can be sampled correctly changes in accordance with the change of the timing of the clock signal CLK for data sampling. For each relay device group, the timing adjustment circuit a 232 selects the optimal timing with which data can be sampled more correctly, of timings having a low BER of data (as will be described later in detail with reference to FIGS. 7A to 7C).

That is, the timing adjustment circuit a 232 uses the variable delay circuits 220-1 and 220-2 to shift the frame signal FR in 24 steps for a period of 3T (see FIG. 5C) with respect to the parallel data accepted through the S/P circuit a 226 and the S/P circuit b 230, so as to select a frame signal FR having the optimal timing.

In addition, the timing adjustment circuit a 232 and the variable delay circuits 220 establish synchronization among signals transmitted through each relay device group so as to suppress interchannel skew of each signal.

(Processing Portion a 234)

The processing portion a 234 (FIG. 3) operates synchronously with the frame signal FR supplied from the variable delay circuit 220-1. The processing portion a 234 performs predetermined processing in the receiver-side LSI b 22, such as storing the data signals DATA.

The memory 238 includes a ROM for storing a test pattern (see FIG. 4E and FIG. 7A) used for timing adjustment, and so on, and a RAM (not shown) for storing checking results of the test pattern and soon. The CPU 236 includes a timer and so on (not shown).

(Transmitter-side LSI b 32)

The transmitter-side LSI b 32 includes a CPU, a ROM, a RAM, a timer, etc. (not shown). Further, a test pattern (see FIG. 4E and FIG. 7A) the same as that in the receiver-side LSI b 22 is stored in the ROM.

The test pattern is transmitted to the receiver-side LSI b 22 through a relay device group in a reception adjustment sequence (which will be described later with reference to FIG. 6).

(Overall Operation)

The overall operation will be described below on the timing adjustment of the signal transmission system.

Figure 6:
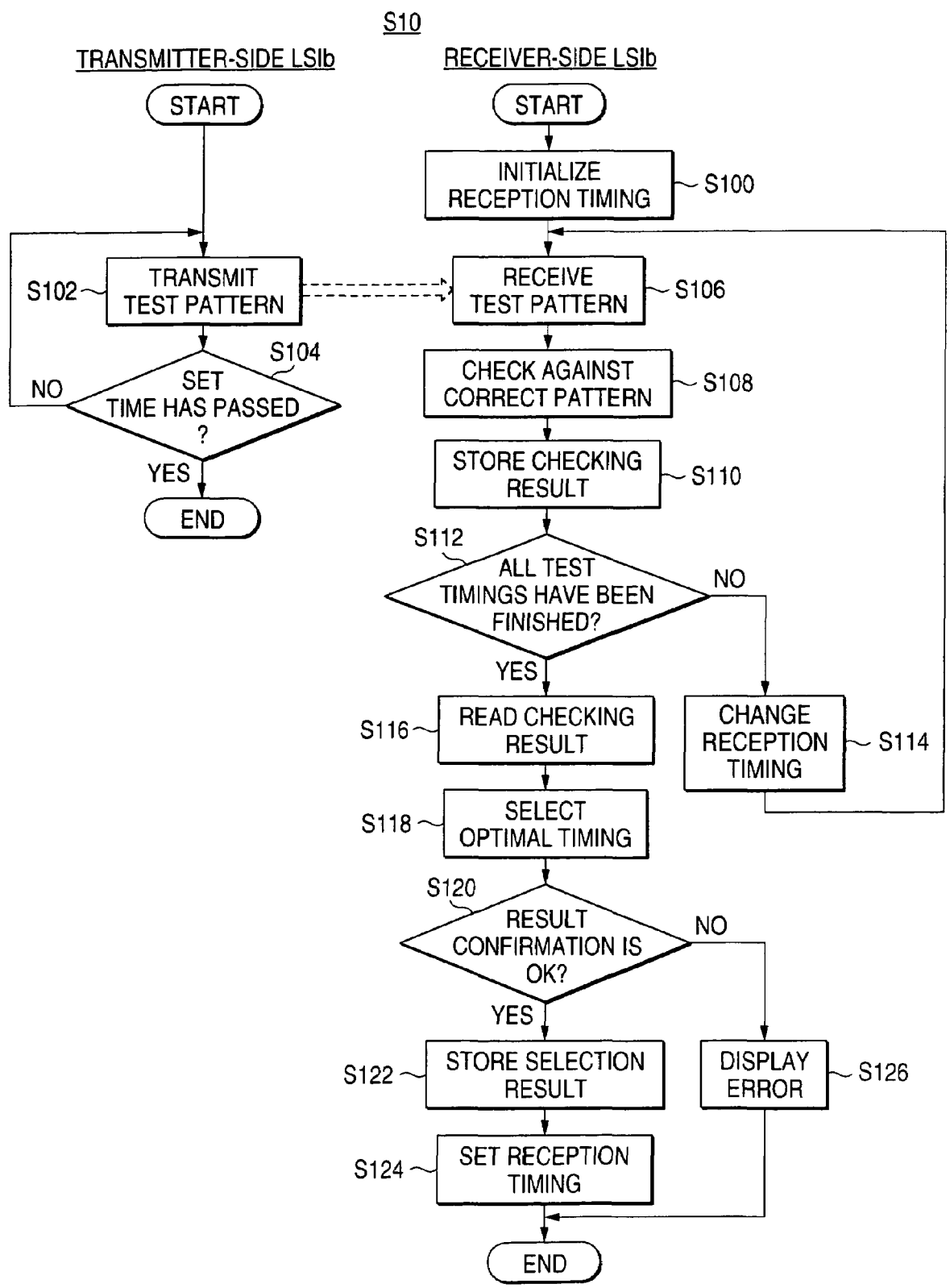
FIG. 6 is a flowchart showing a reception adjustment sequence for the receiver-side LSI b to adjust the reception timing in the signal transmission system shown in FIG. 2.

FIG. 6 is a flow chart showing a reception adjustment sequence (S10) for the receiver-side LSI b 22 to adjust the reception timing in the signal transmission system shown in FIG. 2.

FIGS. 7A to 7C are diagrams showing a test pattern used for the timing adjustment and an example of the test result. FIG. 7A shows an example of a transmitted test pattern (bit sequence 1). FIG. 7B shows an example of reception (bit sequence 2) obtained by receiving the bit sequence 1. FIG. 7C is a table showing an example of the results of receiving the test pattern in 24 kinds of different timings with the delay of the frame signal FR varied continuously. (See FIGS. 5A, 5B and 5C)

As shown in FIG. 6, in Step S100, the timing adjustment circuit a 232 (FIG. 3) of the receiver-side LSI b 22 initializes the reception timing for the variable delay circuits 220-1 and 220-2 for adjusting the reception timing for each relay device group.

In Step S102, the transmitter-side LSI b 32 (FIG. 2) transmits a test pattern (FIG. 7A; bit sequence 1) stored in the ROM (not shown) of the transmitter-side LSI b 32, to the receiver-side LSI b 22, for example, through the second relay device group.

The bit sequence 1 is transmitted repeatedly as the transmitted test pattern.

In Step S104, the transmitter-side LSI b 32 transmits the test pattern till a time set in advance has passed.

It is confirmed, for example, by a timer (not shown) or the like that the set time has passed.

The time set for transmitting the test pattern is much longer than the processing time required for S106 to S126 carried out in the receiver-side LSI b 22, which will be described later.

In Step S106, the receiver-side LSI b 22 receives the test pattern (FIG. 7A) transmitted from the transmitter-side LSI b 32, synchronously with the frame signal FR supplied from the variable delay circuit 220-1 or 220-2 and the clock signal CLK supplied from the PLL 222-1 or 222-2.

In Step S108, the receiver-side LSI b 22 checks the received test pattern against a test pattern (correct test pattern) stored in the ROM (not shown) of the memory 238.

The checking against the correct test pattern is performed as to "whether individual bits have been received correctly or not; (result 1)" and "how many bit shifts are required for coincidence with the correct test pattern when the individual bits are correct; (result 2)".

For example, individual bits of the received bit sequence 2 (FIG. 7B) are identical to individual bits of the bit sequence 1 (FIG. 7A), and the start bit is simply right-shifted by one bit with respect to the frame signal FR (See FIGS. 4E and 4F).

In Step S110, the checking result of the received test pattern against the correct test pattern is stored, for example, in the RAM (not shown) of the memory 238.

The checking result when the bit sequence 2 is received includes "individual bits have been received correctly (OK); result 1" and "it will coincide with the correct test pattern if the frame signal FR is right-shifted by one bit; result 2".

In Step S112, the timing of the frame signal FR is varied continuously, and it is, for example, judged whether the test pattern has been received with 24 kinds of different timings or not.

When reception with 24 kinds of different timings has succeeded, the routine of processing advances to the processing of S116. Otherwise, the routine of processing advances to the processing of S114.

In Step S114, the timing adjustment circuit a 232 supplies the reception delay instruction signals RDa and RDb to the variable delay circuits 220-1 and 220-2 respectively so as to execute S106 while varying the reception timing.

In Step S116, for example, the CPU 236 of the timing adjustment circuit a 232 reads, from the RAM (not shown) of the memory 238, 24 kinds of checking results of the test pattern received while varying the reception timing continuously as shown in FIG. 7C.

In Step S118, the CPU 236 of the timing adjustment circuit a 232 selects the optimal timing from the 24 kinds of reception timings on the basis of the checking results shown in FIG. 7C.

The selection is carried out in the method in which, of the reception timings 3-7, 11-15 and 19-23 whose result 1 is "OK", the timing set at the reception timing 13 with no required shift number in the result 2 and located in the middle of good reception results is regarded as the optimal reception timing.

In Step S120, when the reception timing cannot be set, for example, when the result 1 is "NG" in all the timings, the routine of processing advances to the processing of S126. Otherwise when the optimal reception timing is selected, the routine of processing advances to the processing of S122.

In Step S122, the optimal reception timing for each relay device group is stored, as a selection result for each relay device group, in the RAM (not shown) included in the memory 238 of the timing adjustment circuit a 232.

In Step S124, the CPU 236 of the timing adjustment circuit a 232 sets the delay of the variable delay circuit 220 on the basis of the selection result of the optimal reception timing stored in the RAM (not shown), so as to set the reception timing for the frame signal FR with respect to reception data for each relay device group.

In Step S126, the receiver-side LSI b 22 gives an instruction to display an error to a not-shown display unit.

Description will be made below on a first modification of the signal transmission system 1.

Figure 8:
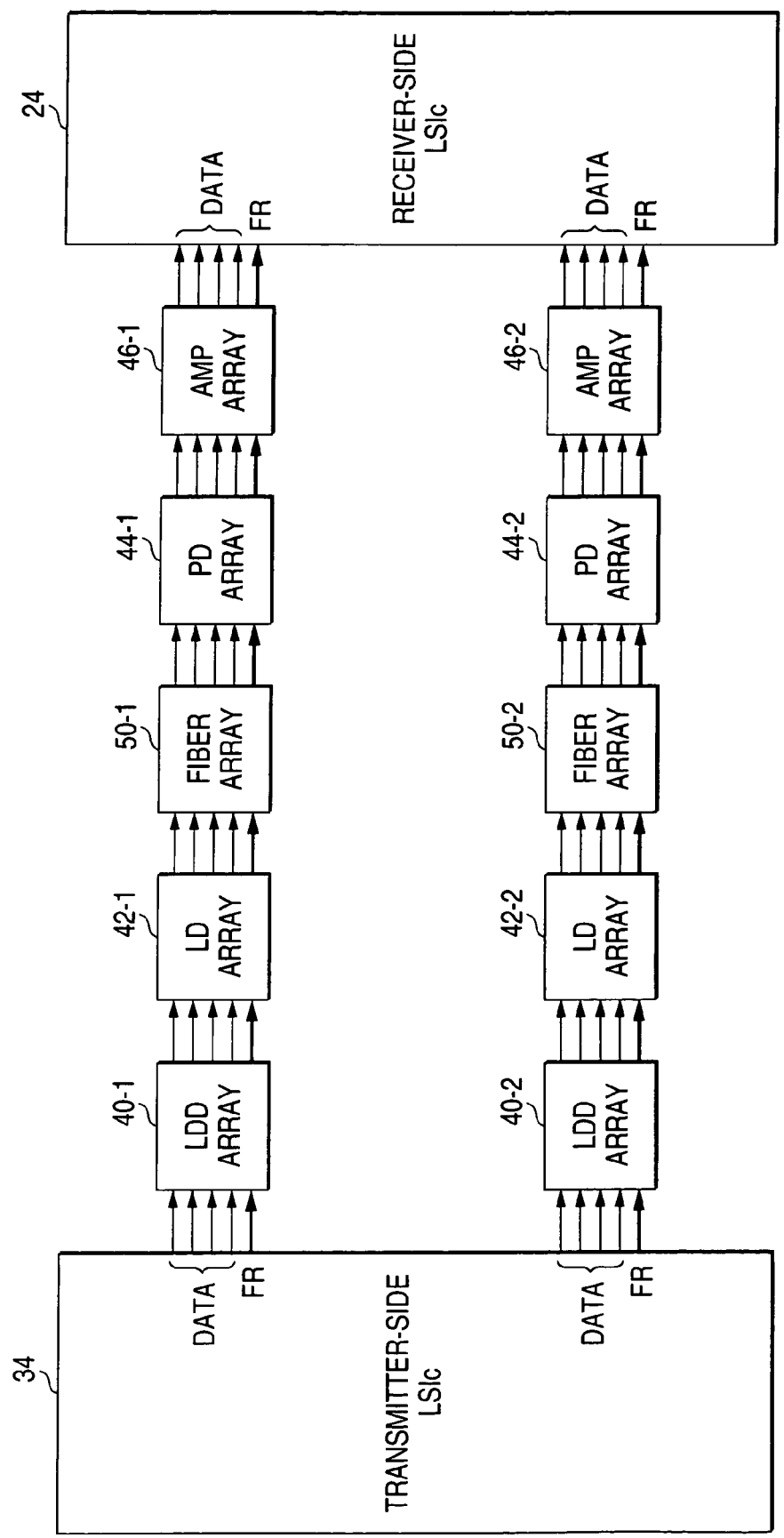
FIG. 8 is a diagram showing a first modification of the signal transmission system shown in FIG. 2.

FIG. 8 is a diagram showing the first modification of the signal transmission system shown in FIG. 2.

Incidentally, of constituent parts in the first modification shown in FIG. 8, parts substantially the same as those in the signal transmission system shown in FIG. 2 are denoted by the same reference numerals correspondingly.

As shown in FIG. 8, the first modification is constituted by a receiver-side LSI c 24, a transmitter-side LSI c 34, LDD arrays 40-1 and 40-2, LD arrays 42-1 and 42-2, PD arrays 44-1 and 44-2, AMP arrays 46-1 and 46-2 and fiber arrays a 50-1 and 50-2.

One of signals transmitted from the transmitter-side LSI c 34 to the receiver-side LSI c 24 through each relay device group is a frame signal FR (FIG. 4B).

(Receiver-Side LSI c 24)

Figure 9:
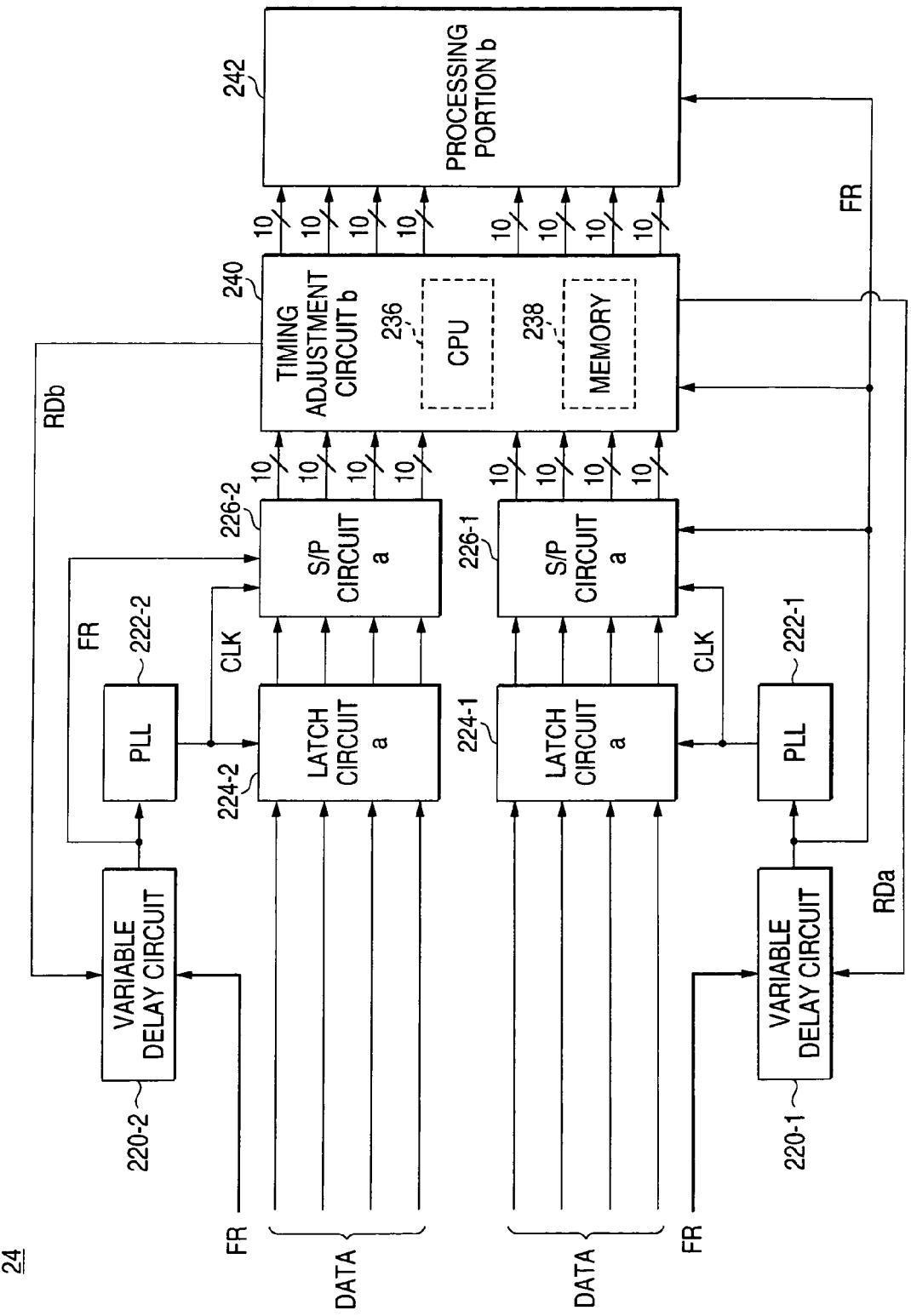
FIG. 9 is a diagram showing the configuration of a receiver-side LSI c shown in FIG. 8.

FIG. 9 is a diagram showing the configuration of the receiver-side LSI c 24 shown in FIG. 8.

Incidentally, of constituent parts of the receiver-side LSI c 24 shown in FIG. 9, parts substantially the same as those in the receiver-side LSI b 22 shown in FIG. 3 are denoted by the same reference numerals correspondingly.

As shown in FIG. 9, the receiver-side LSI c 24 is constituted by variable delay circuits 220-1 and 220-2, PLLs 222-1 and 222-2, latch circuits a 224-1 and 224-2, S/P circuits a 226-1 and 226-2, a timing adjustment circuit b 240 and a processing portion b 242.

(Timing Adjustment Circuit b 240)

The timing adjustment circuit b 240 includes a CPU 236, a memory 238 and so on, operating synchronously with the frame signal FR supplied from the variable delay circuit 220-1, accepting the parallel data from the S/P circuit a 226-1 and 226-2, and supplying given parallel data to the processing portion b 242.

The timing adjustment circuit b 240 detects a lag in reception timing between the parallel data (see FIG. 5C) supplied from the S/P circuit a 226-1 and the frame signal FR (see FIG. 5B) supplied from the transmitter-side LSI c 34 (FIG. 8) through the second relay device group and the variable delay circuit 220-1. The timing adjustment circuit b 240 further detects a lag in reception timing between the parallel data supplied from the S/P circuit a 226-2 synchronously with the frame signal FR supplied through the first relay device group and the variable delay circuit 220-2, and the frame signal FR supplied from the transmitter-side LSI c 34 through the second relay device group and the variable delay circuit 220-1. Then, the timing adjustment circuit b 240 supplies the reception delay instruction signals RDa and RDb to the variable delay circuits 220-1 and 220-2 respectively so as to adjust the reception timing for signals transmitted through each relay device group.

(Processing Portion b 242)

The processing portion b 242 performs predetermined processing in the receiver-side LSI c 24, such as storing the data signals DATA.

In the first modification, synchronization can be established between data signals transmitted through each relay device group and the frame signal FR even if there is a large difference between the delay caused by the first relay device group and the delay caused by the second relay device group. Thus, the time required for adjusting the reception timing in the receiver-side LSI c 24 can be shortened.

Description will be made below on a second modification of the signal transmission system 1.

Figure 10:
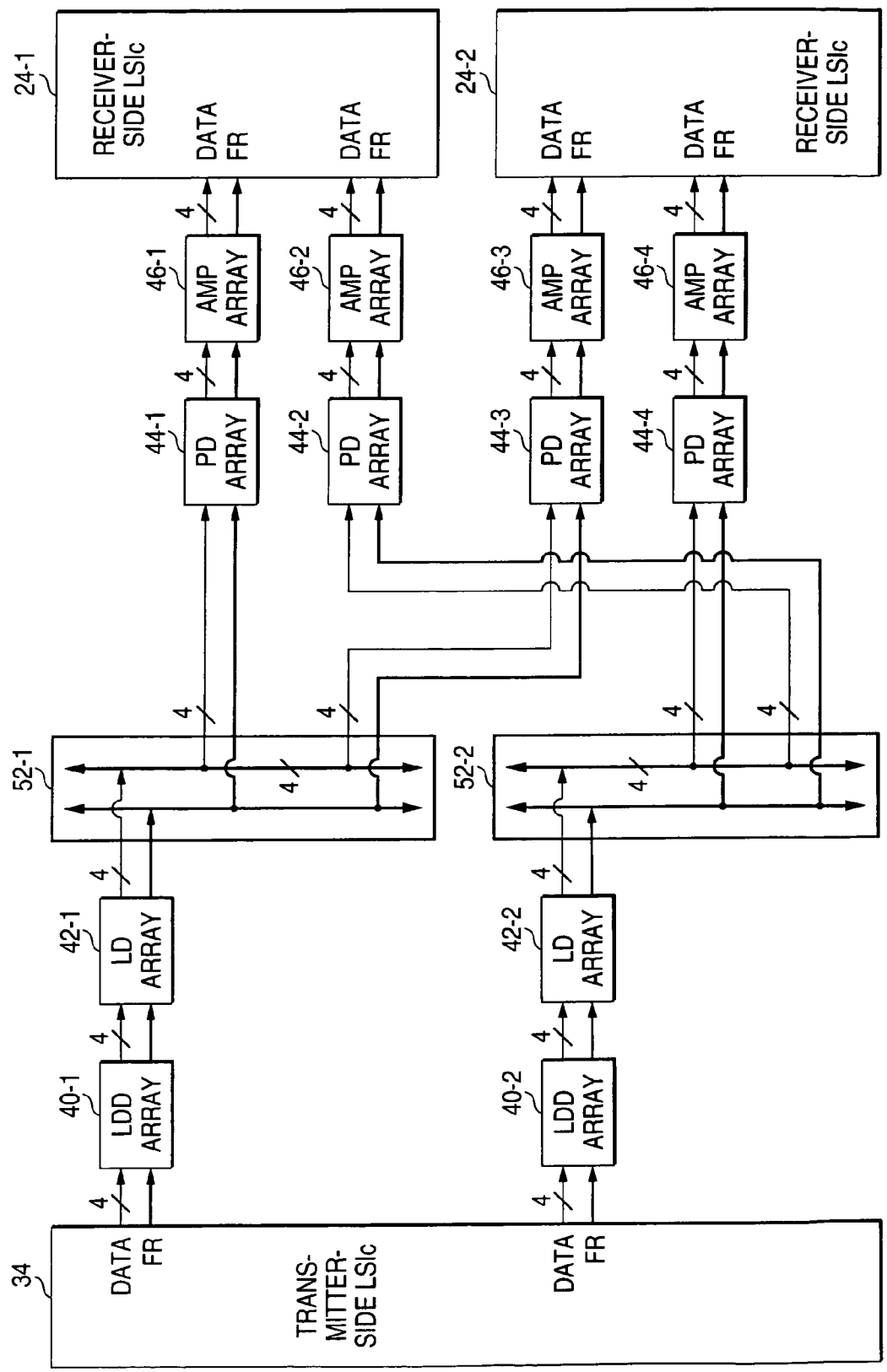
FIG. 10 is a diagram showing a second modification in which the first modification shown in FIG. 8 has been further modified.

FIG. 10 is a diagram showing the second modification in which the first modification shown in FIG. 8 has been further modified.

Incidentally, of constituent parts in the second modification shown in FIG. 10, parts substantially the same as those in the first modification shown in FIG. 8 are denoted by the same reference numerals correspondingly.

As shown in FIG. 10, the second modification is constituted by receiver-side LSIs c 24-1 and 24-2, a transmitter-side LSI c 34, LDD arrays 40-1 and 40-2, LD arrays 42-1 and 42-2, PD arrays 44-1 to 44-4, AMP arrays 46-1 to 46-4 and fiber arrays b 52-1 and 52-2 for optical paths.

Each fiber array b 52 is a fiber array for an optical path where five transmission signals supplied from one LD array 42 are transmitted to two PD arrays 44.

In the second modification, in signal transmission from the transmitter-side LSI c 34 to the receiver-side LSI c 24-1, the LDD array 40-1, the LD array 42-1, the PD array 44-1, the AMP array 46-1 and the fiber array b 52-1 can be regarded as the first relay device group while the LDD array 40-2, the LD array 42-2, the PD array 44-2, the AMP array 46-2 and the fiber array b 52-2 can be regarded as the second relay device group.

On the other hand, in signal transmission from the transmitter-side LSI c 34 to the receiver-side LSI c 24-2, the LDD array 40-1, the LD array 42-1, the PD array 44-3, the AMP array 46-3 and the fiber array b 52-1 can be regarded as the first relay device group while the LDD array 40-2, the LD array 42-2, the PD array 44-4, the AMP array 46-4 and the fiber array b 52-2 can be regarded as the second relay device group.

Accordingly, in the second modification, it is possible to adjust the timing for signals transmitted through each relay device group, the timing in one receiver-side LSI in signal transmission through a plurality of relay device groups, and the timing in one-to-many signal transmission in which signals are transmitted from one transmitter-side LSI to a plurality of receiver-side LSIs.

In addition, synchronization can be established between data signals transmitted through transmission paths regarded as one and the same relay device group and the frame signal FR even if the difference between the reception timing with which the receiver-side LSI c 24-1 receives signals and the reception timing with which the receiver-side LSI c 24-2 receives signals is large due to the difference in transmission path length or the like. Thus, it is possible to adjust the reception timing in the receiver-side LSIs c 24-1 and 24-2 easily.

Description will be made below on a third modification of the signal transmission system 1.

Figure 11:
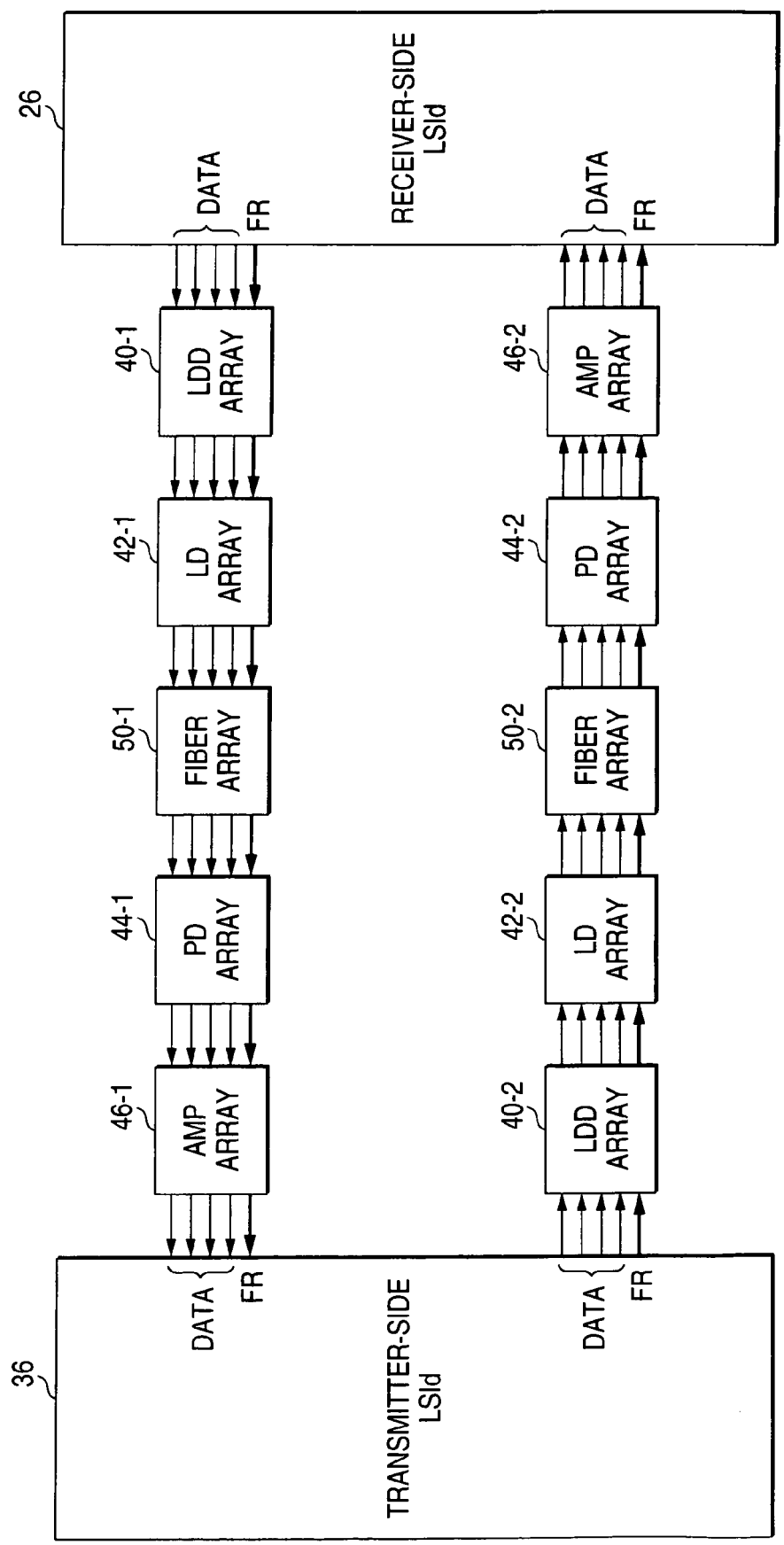
FIG. 11 is a diagram showing a third modification in which the signal transmission system shown in FIG. 2 has been modified.

FIG. 11 is a diagram showing the third modification in which the signal transmission system shown in FIG. 2 has been modified.

Incidentally, of constituent parts in the third modification shown in FIG. 11, parts substantially the same as those in the signal transmission system shown in FIG. 2 are denoted by the same reference numerals correspondingly.

As shown in FIG. 11, the third modification is constituted by a receiver-side LSI d 26, a transmitter-side LSI d 36, LDD arrays 40-1 and 40-2, LD arrays 42-1 and 42-2, PD arrays 44-1 and 44-2, AMP arrays 46-1 and 46-2 and fiber arrays a 50-1 and 50-2.

The transmitter-side LSI d 36 transmits transmission signals to the receiver-side LSI d 26 through the second relay device group.

The receiver-side LSI d 26 transmits transmission signals to the transmitter-side LSI d 36 through the first relay device group.

(Transmitter-Side LSI d 36)

Figure 12:
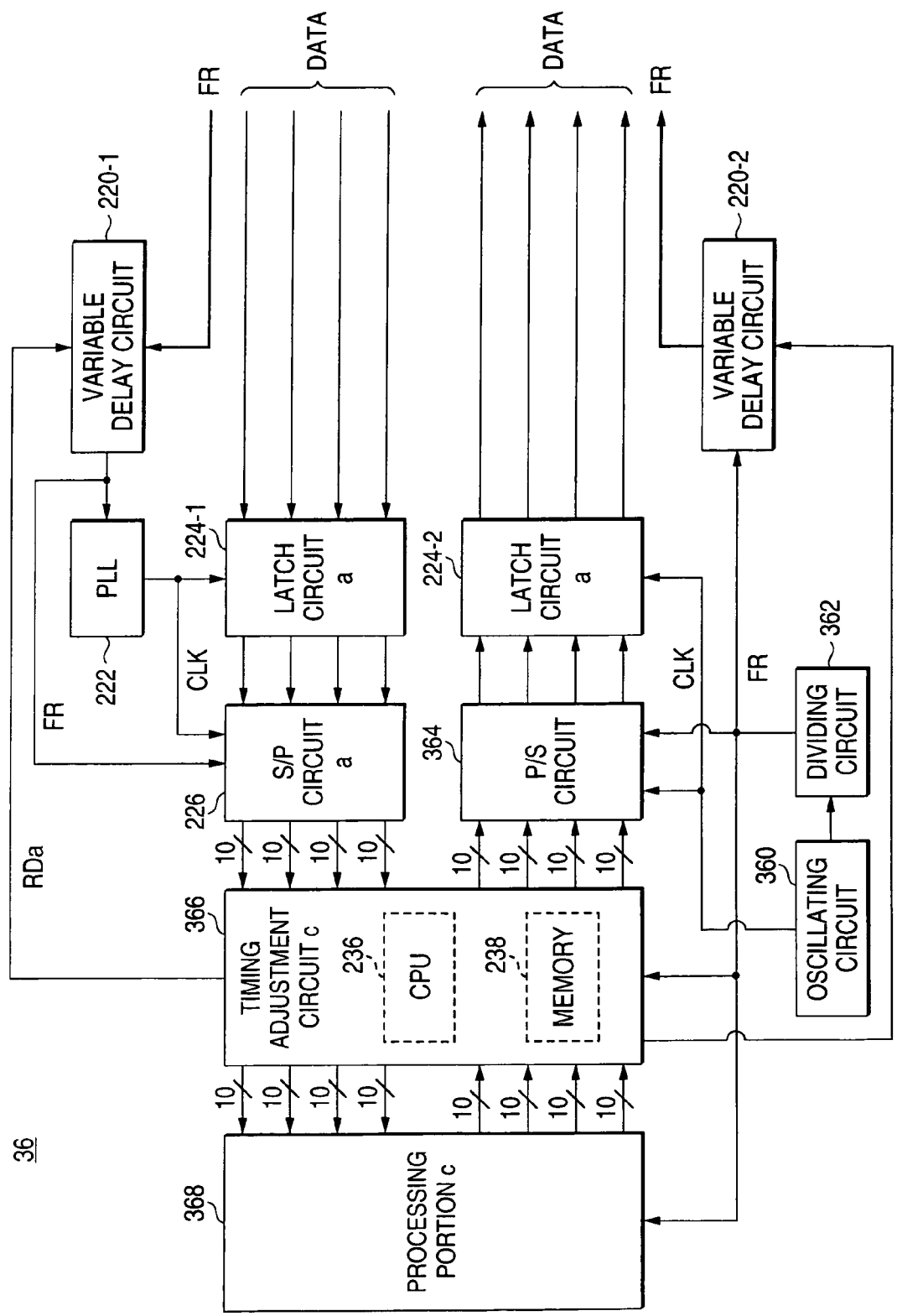
FIG. 12 is a diagram showing the configuration of a transmitter-side LSI d shown in FIG. 11.

FIG. 12 is a diagram showing the configuration of the transmitter-side LSI d 36 shown in FIG. 11.

Incidentally, of constituent parts in the transmitter-side LSI d 36 shown in FIG. 12, parts substantially the same as those in the receiver-side LSI b 22 shown in FIG. 3 are denoted by the same reference numerals correspondingly.

As shown in FIG. 12, the transmitter-side LSI d 36 is constituted by an oscillating circuit 360, a dividing circuit 362, variable delay circuits 220-1 and 220-2, a PLL 222, latch circuits a 224-1 and 224-2, an S/P circuit a 226, a parallel-to-serial conversion circuit (P/S circuit) 364, a timing adjustment circuit c 366 and a processing portion c 368.

(Oscillating Circuit 360)

The oscillating circuit 360 generates a clock signal CLK by means of an oscillator or the like, and supplies the clock signal CLK to the dividing circuit 362, the timing adjustment circuit c 366, the P/S circuit 364 and the latch circuit a 224-2.

(Dividing Circuit 362)

The dividing circuit 362 divides the clock signal CLK supplied from the oscillating circuit 360, for example, into ten, so as to generate a frame signal FR. The frame signal FR is supplied to the variable delay circuit 220-2, the P/S circuit 364, the timing adjustment circuit c 366 and the processing portion c 368.

(P/S Circuit 364)

The P/S circuit 364 operates synchronously with the clock signal CLK supplied from the oscillating circuit 360 and the frame signal FR supplied from the dividing circuit 362, so that four pieces of 10-bit parallel data supplied from the timing adjustment circuit c 366 are converted into serial data respectively. The serial data is supplied to the latch circuit a 224-2.

(Timing Adjustment Circuit c 366)

The timing adjustment circuit c 366 includes a CPU 236, a memory 238 and so on, operating synchronously with the frame signal FR supplied from the dividing circuit 362, accepting the parallel data from the S/P circuit a 226, supplying given parallel data to the processing portion c 368, accepting the parallel data from the processing portion c 368, and supplying given parallel data to the P/S circuit 364.

In addition, against the lag between data signals DATA received through the second relay device group by the receiver-side LSI d 26 (FIG. 11) and the frame signal FR, the timing adjustment circuit c 366 supplies a transmission delay instruction signal TDa to the variable delay circuit 220-2 in accordance with a selection result (which will be described later with reference to FIG. 14) of the optimal timing transmitted from the receiver-side LSI d 26. Thus, the transmission timing of the frame signal FR supplied from the dividing circuit 362 to the receiver-side LSI d 26 through the variable delay circuit 220-2 is adjusted.

The S/P circuit a 226 operates synchronously with the frame signal FR supplied through the first relay device group and the variable delay circuit 220-1. The timing adjustment circuit c 366 detects a lag in timing between the parallel data supplied from the S/P circuit a 266 and the frame signal FR supplied from the dividing circuit 362. Then, the timing adjustment circuit c 366 supplies a reception delay instruction signal RDa to the variable delay circuits 220-1 so as to adjust the reception timing for signals transmitted through the first relay device group.

(Processing Portion c 368)

The processing portion c 368 performs predetermined processing in the transmitter-side LSI d 36, such as operating or storing the data signals DATA.

(Receiver-Side LSI d 26)

Figure 13:
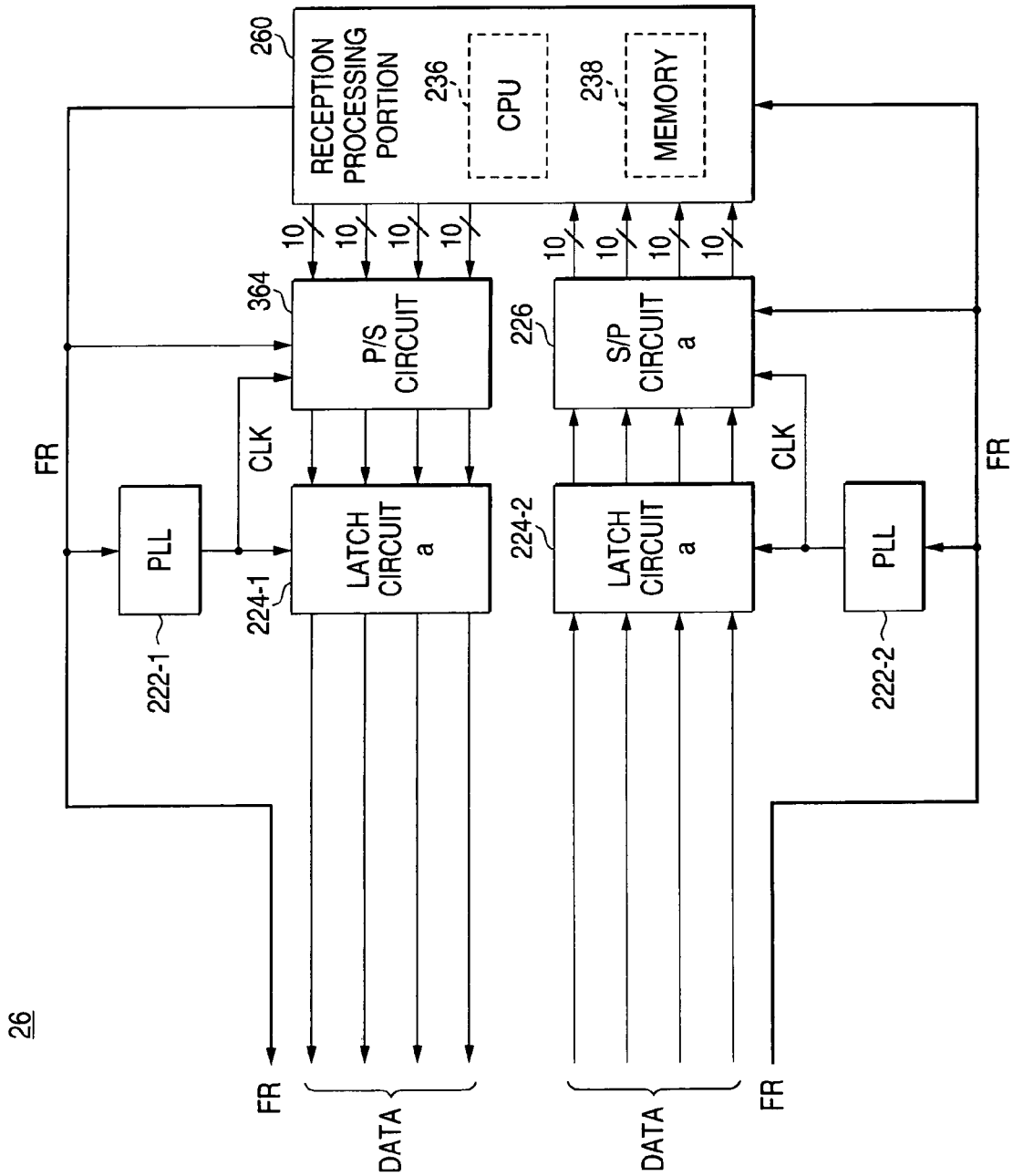
FIG. 13 is a diagram showing the configuration of a receiver-side LSI d shown in FIG. 11.

FIG. 13 is a diagram showing the configuration of the receiver-side LSI d 26 shown in FIG. 11.

Incidentally, of constituent parts of the receiver-side LSI d 26 shown in FIG. 13, parts substantially the same as those in the receiver-side LSI b 22 shown in FIG. 3 and the transmitter-side LSI d 36 shown in FIG. 12 are denoted by the same reference numerals correspondingly.

As shown in FIG. 13, the receiver-side LSI d 26 is constituted by PLLs 222-1 and 222-2, latch circuits a 224-1 and 224-2, an S/P circuit a 226, a P/S circuit 364 and a reception processing portion 260.

(Reception Processing Portion 260)

The reception processing portion 260 includes a CPU 236, a memory 238 and so on, operating synchronously with the frame signal FR supplied through the second relay device group and the clock signal CLK supplied from the PLL 222-2, accepting the parallel data from the S/P circuit a 226, carrying out predetermined processing such as storing reception data or carrying out selection of the optimal transmission timing from the transmitter-side LSI d 36 (which selection will be described later with reference to FIG. 14) and supplying given parallel data to the P/S circuit 364.

In addition, the frame signal FR supplied through the second relay device group is supplied to the P/S circuit 364, the PLL 222-1 and the first relay device group.

Description will be made below on a transmission adjustment sequence in the third modification.

Figure 14:
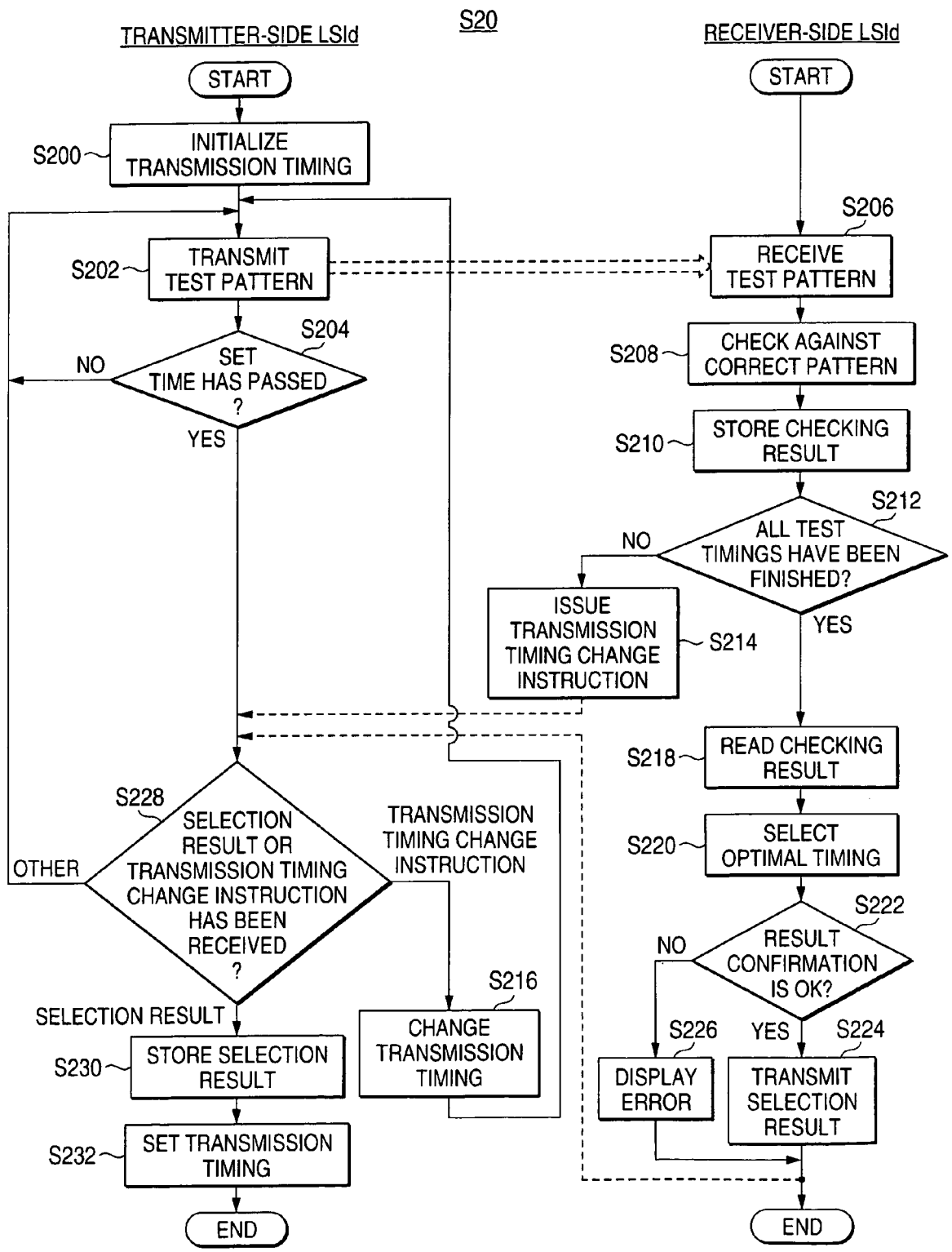
FIG. 14 is a flow chart showing a transmission adjustment sequence for the transmitter-side LSI d to adjust the transmission timing for the receiver-side LSI d in the third modification shown in FIG. 11.

FIG. 14 is a flow chart showing a transmission adjustment sequence (S20) for the transmitter-side LSI d 36 to adjust the transmission timing for the receiver-side LSI d 26 in the third modification shown in FIG. 11.

As shown in FIG. 14, in Step S200, the timing adjustment circuit c 366 (FIG. 12) of the transmitter-side LSI d 36 initializes the transmission timing for the variable delay circuits 220-1 and 220-2.

In Step S202, for example, the transmitter-side LSI d 36 (FIG. 12) transmits a test pattern (FIG. 7A; bit sequence 1) stored in the ROM (not shown) of the transmitter-side LSI d 36, to the receiver-side LSI d 26 (FIG. 13) through the second relay device group.

The bit sequence 1 is transmitted repeatedly as the transmitted test pattern.

In Step S204, the transmitter-side LSI d 36 confirms, for example, by means of a timer (not shown) or the like, that the time set for transmitting the test pattern has passed.

The time set for transmitting the test pattern is much longer than the processing time required for S206 to S226 which are carried out in the receiver-side LSI d 26 and which will be described later.

In Step S206, the receiver-side LSI d 26 receives the test pattern (FIG. 7A) transmitted from the transmitter-side LSI d 36, synchronously with the frame signal FR supplied from the transmitter-side LSI d 36 through the second relay device group and the clock signal CLK supplied from the PLL 222-2.

In Step S208, the receiver-side LSI d 26 checks the received test pattern against a test pattern (correct test pattern) stored in the ROM (not shown) of the memory 238 (See FIGS. 4E and 4F).

In Step S210, the checking result of the received test pattern against the correct test pattern is stored, for example, in the RAM (not shown) of the memory 238 (See FIG. 7C).

In Step S212, the timing of the frame signal FR is varied continuously, and it is, for example, judged whether the test pattern has been received with 24 kinds of different timings or not.

When reception with 24 kinds of different timings has succeeded, the routine of processing advances to the processing of S218. Otherwise, the routine of processing advances to the processing of S214.

In Step S214, the reception processing portion 260 transmits a signal of an instruction to change the transmission timing, to the transmitter-side LSI d 36 through the first relay device group. Then, the routine of processing advances to the processing of S228.

In Step S228, the transmitter-side LSI d 36 judges whether the signal transmitted from the receiver-side LSI d 26 is a signal of an instruction to change the transmission timing or a signal of a selection result. In the case of an instruction to change the transmission timing, the routine of processing advances to the processing of S216. In the case of a selection result, the routine of processing advances to the processing of S230. Otherwise, the routine of processing advances to the processing of S202.

In Step S216, the timing adjustment circuit c 366 of the transmitter-side LSI d 36 supplies the transmission delay instruction signal TDa to the variable delay circuit 220-2, so as to change the transmission timing with which the variable delay circuit 220-2 supplies the frame signal FR to the second relay device group.

In Step S218, for example, the CPU 236 reads, from the RAM (not shown) of the memory 238 in the receiver-side LSI d 26, 24 kinds of checking results of the test pattern received by the receiver-side LSI d 26 while varying the transmission timing of the transmitter-side LSI d 36 continuously as shown in FIG. 7C.

In Step S220, the CPU 236 of the receiver-side LSI d 26 selects the optimal timing from the 24 kinds of reception timings on the basis of the checking results shown in FIG. 7C.

The selection is carried out in the method in which, of the transmission timings 3-7, 11-15 and 19-23 of the transmitter-side LSI d 36 whose result 1 is "OK", the timing set at the transmission timing 13 with no required shift number in the result 2 and located in the middle of good transmission results is regarded as the optimal transmission timing.

In Step S222, when the transmission timing of the transmitter-side LSI d 36 cannot be set, for example, when the result 1 is "NG" in all the timings, the routine of processing advances to the processing of S226. Otherwise when the optimal transmission timing is selected, the routine of processing advances to the processing of S224.

In Step S226, the receiver-side LSI d 26 gives an instruction to display an error to a not-shown display unit.

In Step S224, the receiver-side LSI d 26 transmits the result indicating the selected optimal transmission timing to the transmitter-side LSI d 36 through the first relay device group.

In Step S230, the CPU 236 of the transmitter-side LSI d 36 stores the selection result of the transmission timing for the second relay device group into the RAM (not shown) included in the memory 238 while specifying a predetermined address therein.

In Step S232, the CPU 236 of the transmitter-side LSI d 36 sets the delay of the variable delay circuit 220-2 on the basis of the selection result of the optimal transmission timing stored in the RAM (not shown), so as to set the transmission timing of the frame signal FR with respect to transmission data.

Description will be made below on a fourth modification of the signal transmission system 1.

Figure 15:
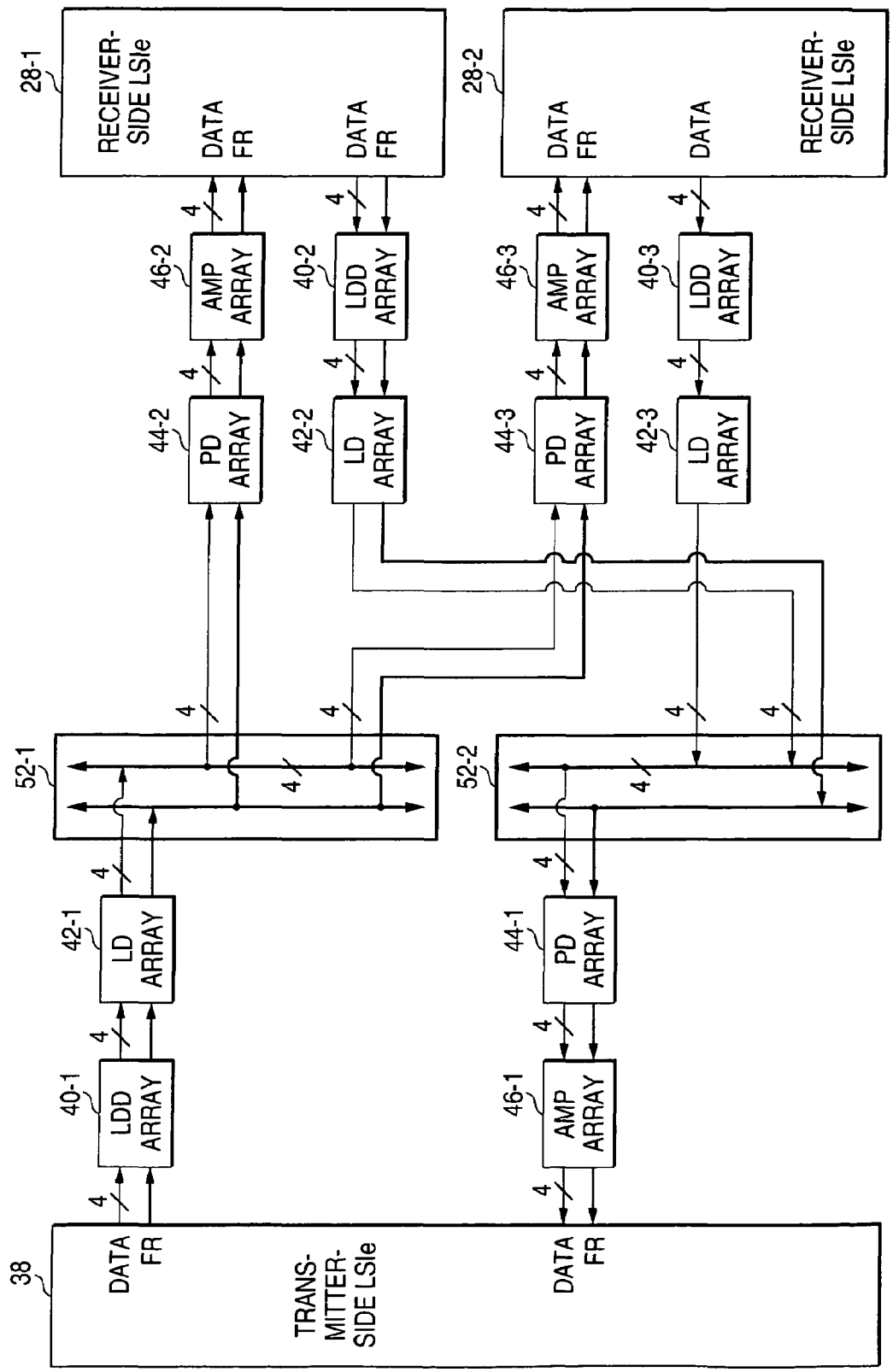
FIG. 15 is a diagram showing a fourth modification in which the signal transmission system shown in FIG. 10 has been modified.

FIG. 15 is a diagram showing the fourth modification in which the signal transmission system shown in FIG. 10 has been modified.

Incidentally, of constituent parts in the fourth modification shown in FIG. 15, parts substantially the same as those in the signal transmission system shown in FIG. 10 are denoted by the same reference numerals correspondingly.

As shown in FIG. 15, the fourth modification is constituted by receiver-side LSIs e 28-1 and 28-2, a transmitter-side LSI e 38, LDD arrays 40-1, 40-2 and 40-3, LD arrays 42-1, 42-2 and 42-3, PD arrays 44-1, 44-2 and 44-3, AMP arrays 46-1, 46-2 and 46-3 and fiber arrays b 52-1 and 52-2.

Incidentally, the receiver-side LSI e 28-1 supplies a frame signal FR to the LDD array 40-2 while the receiver-side LSI e 28-2 does not connect the output of a frame signal FR to the LDD array 40-3. Therefore, the frame signal FR is supplied to the fiber array b 52-2 only from the receiver-side LSI e 28-1.

Thus, the timing adjustment is made so that data signals DATA transmitted from the receiver-side LSI e 28-2 are synchronized with the frame signal FR outputted from the receiver-side LSI e 28-1.

(Transmitter-side LSI e 38)

Figure 16:
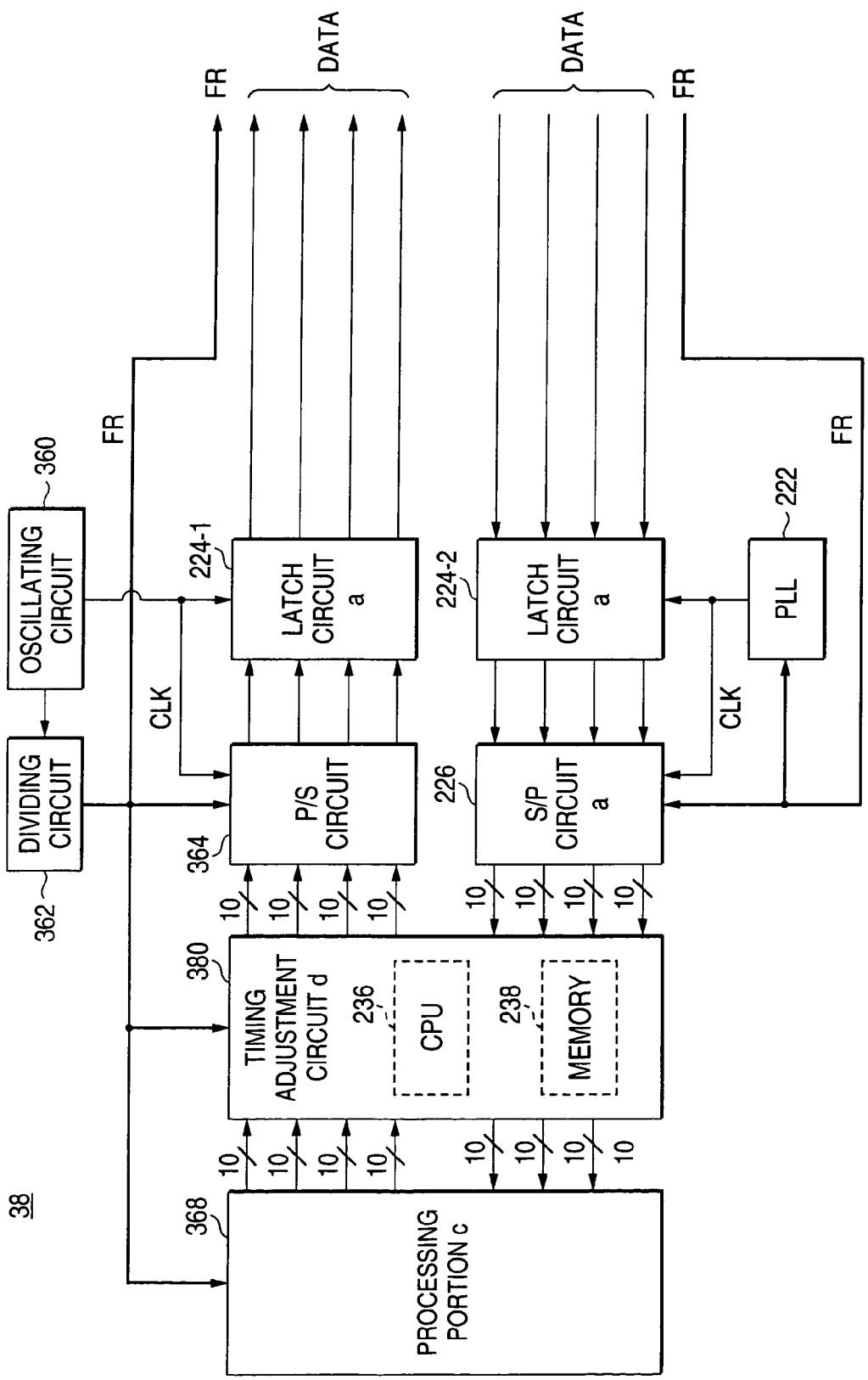
FIG. 16 is a diagram showing the configuration of a transmitter-side LSI e shown in FIG. 15.

FIG. 16 is a diagram showing the configuration of the transmitter-side LSI e 38 shown in FIG. 15.

Incidentally, of constituent parts in the transmitter-side LSI e 38 shown in FIG. 16, parts substantially the same as those in the receiver-side LSI b 22 shown in FIG. 3 and the transmitter-side LSI d 36 shown in FIG. 12 are denoted by the same reference numerals correspondingly.

As shown in FIG. 16, the transmitter-side LSI e 38 is constituted by an oscillating circuit 360, a dividing circuit 362, a PLL 222, latch circuits a 224-1 and 224-2, an S/P circuit a 226, a P/S circuit 364, a timing adjustment circuit d 380 and a processing portion c 368.

(Timing Adjustment Circuit d 380)

The timing adjustment circuit d 380 includes a CPU 236, a memory 238 and so on, operating synchronously with the frame signal FR supplied from the dividing circuit 362, accepting the parallel data from the S/P circuit a 226, supplying given parallel data to the processing portion c 368, accepting the parallel data from the processing portion c 368, and supplying given parallel data to the P/S circuit 364.

(Receiver-Side LSI e 28)

Figure 17:
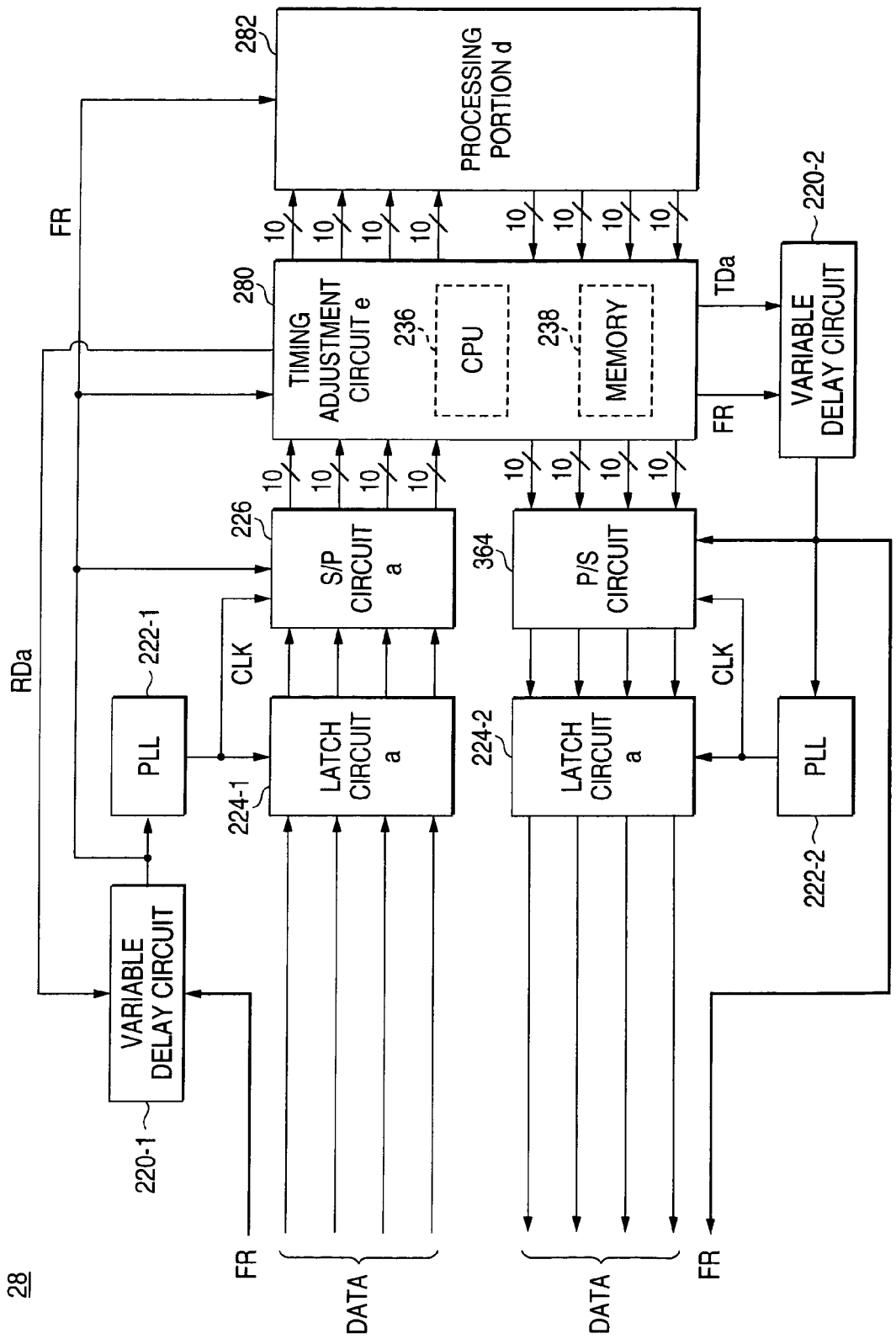
FIG. 17 is a diagram showing the configuration of a receiver-side LSI e shown in FIG. 15.

FIG. 17 is a diagram showing the configuration of the receiver-side LSI e 28 shown in FIG. 15.

Incidentally, of constituent parts of the receiver-side LSI e 28 shown in FIG. 17, parts substantially the same as those in the receiver-side LSI b 22 shown in FIG. 3 and the transmitter-side LSI d 36 shown in FIG. 12 are denoted by the same reference numerals correspondingly.

As shown in FIG. 17, the receiver-side LSI e 28 is constituted by variable delay circuits 220-1 and 220-2, PLLs 222-1 and 222-2, latch circuits a 224-1 and 224-2, an S/P circuits a 226, a P/S circuit 364, a timing adjustment circuit e 280 and a processing portion d 282.

(Timing Adjustment Circuit e 280)

The timing adjustment circuit e 280 includes a CPU 236, a memory 238 and so on, operating synchronously with the frame signal FR supplied from the variable delay circuit 220-1, accepting parallel data from the S/P circuit a 226, supplying given parallel data to the processing portion d 282, accepting parallel data from the processing portion d 282, and supplying given parallel data to the P/S circuit 364.

The timing adjustment circuit e 280 detects a lag in timing between the parallel data supplied from the S/P circuit a 226 and the frame signal FR supplied from the transmitter-side LSI e 38 (FIG. 15) through the variable delay circuit 220-1, and supplies a reception delay instruction signal RDa to the variable delay circuits 220-1 so as to adjust the reception timing for signals to be transmitted.

In addition, against the lag between the data signals DATA received by the transmitter-side LSI e 38 and the frame signal FR, the timing adjustment circuit e 280 supplies a transmission delay instruction signal TDa to the variable delay circuits 220-2 so as to adjust the timing of the frame signal FR on the basis of the selection result of the optimal timing transmitted from the transmitter-side LSI e 38.

(Processing Portion d 282)

The processing portion d 282 operates synchronously with the frame signal FR supplied from the variable delay circuit 220-1, and performs predetermined processing in the receiver-side LSI e 28 such as storing the data signals DATA.

Description will be made below on the operation in a transmission adjustment sequence (S30) for the receiver-side LSI e 28 to adjust the transmission timing in FIGS. 18 and 19.

Figure 18:
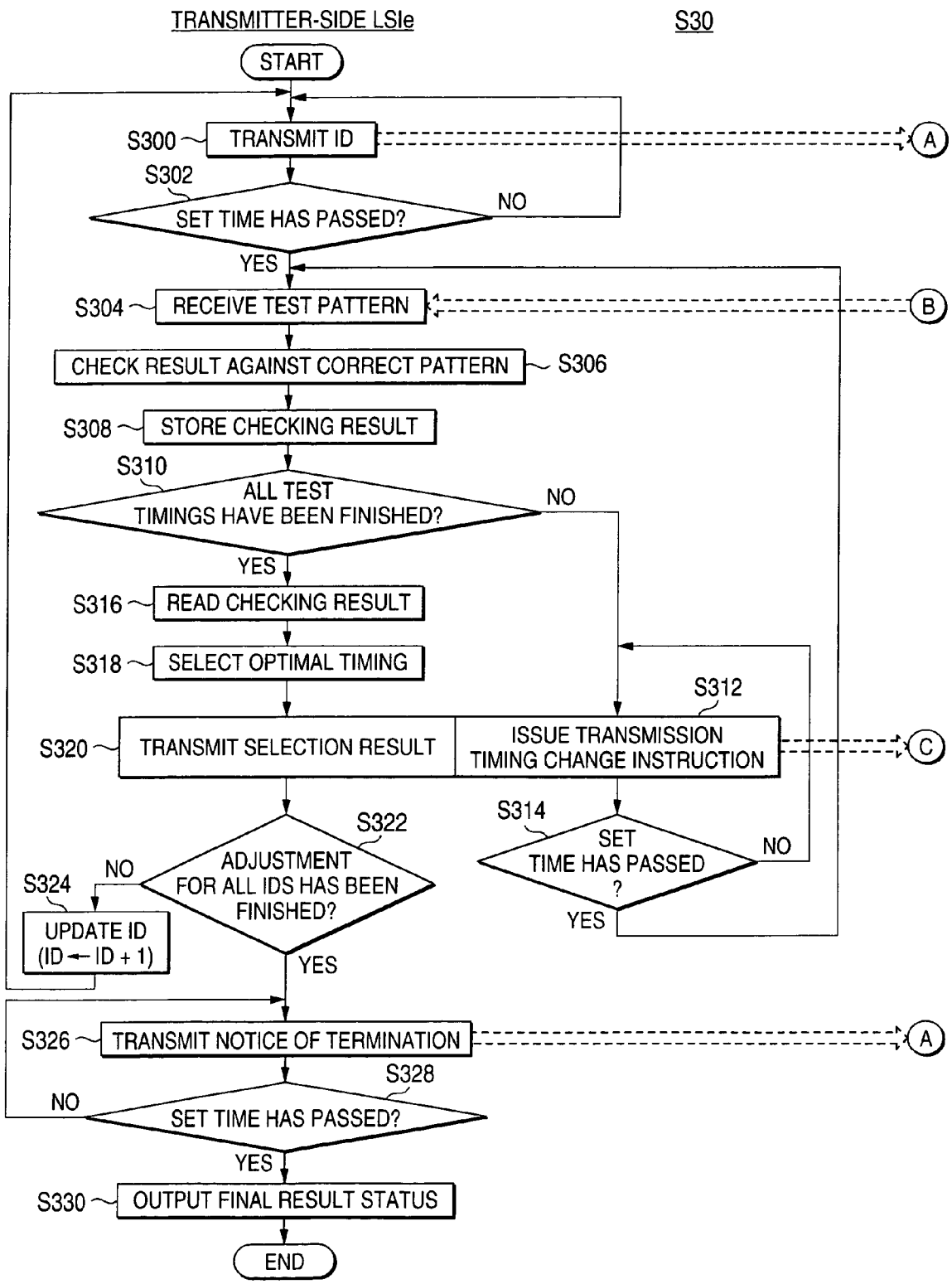
FIG. 18 is a flow chart showing a transmission adjustment sequence (on the transmitter-side LSI e side) of the receiver-side LSI e.

FIG. 18 is a flow chart showing a transmission adjustment sequence (on the transmitter-side LSI e 38 side) of the receiver-side LSI e 28.

Incidentally, S3xx designates the processing by the transmitter-side LSI e 38 in S30.

FIG. 19 is a flow chart showing a transmission adjustment sequence (on the receiver-side LSI e 28 side) of the receiver-side LSI e 28.

Incidentally, S4xx designates the processing by the receiver-side LSI e 28 in S30.

As shown in FIG. 18, in Step S300, the timing adjustment circuit d 380 of the transmitter-side LSI e 38 transmits an ID proper to the receiver-side LSI e 28-1 or 28-2 to the receiver-side LSIs e 28.

The IDs of the receiver-side LSIs e 28-1 and 28-2 are set to be consecutive numbers.

In Step S302, the transmitter-side LSI e 38 confirms, for example, by means of a timer or the like of the CPU 236 included in the timing adjustment circuit d 380, that the time set for transmitting the ID has passed.

As shown in FIG. 19, in Step S400, the timing adjustment circuit e 280 of the receiver-side LSI e 28 initializes the transmission timing.

In Step S402, the timing adjustment circuit e 280 of the receiver-side LSI e 28 confirms whether the signal transmitted from the transmitter-side LSI e 38 is an ID signal or a termination signal. When it is an ID signal, the sequence advances to S404. When it is a termination signal, the sequence is terminated. Otherwise, the sequence continues to receive signals.

In Step S404, the timing adjustment circuit e 280 of the receiver-side LSI e 28 checks the signal transmitted from the transmitter-side LSI e 38 against its own ID signal. The checking result is stored, for example, in a register.

In Step S406, when the checking result in S404 specifies the LSI of its own, the timing adjustment circuit e 280 of the receiver-side LSI e 28 advances to the processing of S408. Otherwise, the timing adjustment circuit e 280 advances to the processing of S410.

In Step S408, the timing adjustment circuit e 280 belonging to the specified LSI transmits a test pattern (see FIG. 4E) stored in its ROM, to the transmitter-side LSI e 38.

In Step S410, any node belonging to an LSI not specified transmits a value with all bits "0" to the transmitter-side LSI e 38, and advances to the processing of S406.

In Step S304, the transmitter-side LSI e 38 receives the test pattern (FIG. 4E) transmitted from the receiver-side LSI e 28, synchronously with the clock signal CLK supplied from the oscillating circuit 360.

As for the reception of the test pattern, 24 kinds of test patterns (see FIG. 7C), for example, with timing varied continuously are received.

In Step S306, the received test pattern is checked against a correct test pattern stored in the ROM of the timing adjustment circuit d 380 in advance.

The checking against the correct test pattern is performed as to "whether individual bits have been received correctly or not; (result 1)" and "how many bit shifts are required for coincidence with the correct test pattern when the individual bits are correct; (result 2)".

For example, the bit sequence 2 shown in FIG. 7B shows a bit sequence received by the transmitter-side LSI e 38 when the bit sequence 1 shown in FIG. 7A has been transmitted from the receiver-side LSI e 28.

Individual bits of the received bit sequence 2 are identical to individual bits of the bit sequence 1, and the start bit is simply shifted by one bit.

The checking result when the bit sequence 2 is received by the transmitter-side LSI e 38 is obtained as "individual bits have been received correctly (OK)" and "it will coincide with the correct test pattern if it is left-shifted by one bit".

In Step S308, the checking result of the received test pattern against the correct test pattern is stored, for example, in the RAM of the timing adjustment circuit d 380.

In Step S310, it is confirmed whether the test pattern has been received with 24 kinds of timings varied continuously or not. When the test pattern has been received with 24 kinds of timings, the routine of processing advances to the processing of S316. Otherwise, the routine of processing advances to the processing of S312.

In Step S316, for example, the CPU 236 reads, from the RAM (not shown) of the timing adjustment circuit d 380, the 24 kinds of checking results of the test pattern received while varying the reception timing continuously as shown in FIG. 7C.

In Step S318, the CPU 236 of the timing adjustment circuit d 380 selects the optimal timing for the transmission of the receiver-side LSI e 28 from the 24 kinds of reception timings on the basis of the checking results shown in FIG. 7C.

The selection is carried out in the method in which, for example, of the transmission timings 3-7, 11-15 and 19-23 of the receiver-side LSI e 28 whose result 1 is "OK", the timing set at the transmission timing 13 with no required shift number in the result 2 and located in the middle of good transmission results is regarded as the optimal transmission timing.

In Step S320, the transmitter-side LSI e 38 transmits the selected optimal transmission timing to the receiver-side LSI e 28.

In Step S312, for example, when reception of 24 kinds of the test pattern with the transmission timing of the receiver-side LSI e 28 varied continuously have not been finished, the timing adjustment circuit d 380 of the transmitter-side LSI e 38 transmits an instruction to change the transmission timing to the receiver-side LSI e 28.

In Step S314, the routine of processing advances to the processing of S312 when a predetermined time has not yet passed. When the predetermined time has passed, the routine of processing advances to the processing of S304.

In Step S322, when adjustment has been finished upon all the IDs of the receiver-side LSIs e 28, the timing adjustment circuit d 380 advances to the processing of S326. When the adjustment has not yet been finished, the timing adjustment circuit d 380 advances to the processing of S324.

In Step S324, the ID number is increased by one. Then, the routine of processing advances to the processing of S300.

In Step S412, the timing adjustment circuit e 280 of the receiver-side LSI e 28 judges whether the signal transmitted from the transmitter-side LSI e 38 is a selection result signal or a timing change instruction signal.

When the signal received from the transmitter-side LSI e 38 is a timing change instruction signal, the routine of processing advances to the processing of S414. When the signal received from the transmitter-side LSI e 38 is a selection result instruction signal, the routine of processing advances to the processing of S416. Otherwise, the routine of processing advances to the processing of S406.

In Step S414, the timing adjustment circuit e 280 of the receiver-side LSI e 28 supplies a transmission control signal TDa to the variable delay circuit 220-2, so as to change the timing of data transmission in the variable delay circuit 220-2. Then, the routine of processing advances to the processing of S406.

In Step S416, the selected optimal transmission timing is stored, as a selection result for each relay device group, in the RAM (not shown) included in the memory 238 in the receiver-side LSI e 28.

In Step S418, the CPU 236 included in the timing adjustment circuit e 280 sets the delay of the variable delay circuit 220-2 on the basis of the selection result of the optimal transmission timing stored in the RAM, so as to set the transmission timing of the frame signal FR.

In Step S420, the receiver-side LSI e 28 having been transmitting a test pattern stops transmitting the test pattern, and advances to the processing of S402.

In Step S326, the transmitter-side LSI e 38 notifies the receiver-side LSI e 28 that the processing for adjusting the transmission timing has been terminated.

In Step S328, the processing of S326 is performed until a set time has passed.

In Step S330, the transmitter-side LSI e 38 supplies a final result of the transmission adjustment sequence to a not-shown status output unit.

As described above, there is only a small variation of propagation delay time, skew or the like in each relay device (such as the LDD array 40 or the LD array 42) constituting a relay device group. In addition, an optical transmission path has only a small variation of propagation delay time in each array. Accordingly, when timing adjustment is performed for signals transmitted through each relay device group, interchannel skew of each of a plurality of signals to be transmitted can be suppressed without increase in the scale of the circuit for adjusting the timing.

In addition, even when a plurality of receiver-side LSIs receive signals with different reception timings due to different transmission path lengths or the like (for example, in case that two distinct transmission path lengths are different, or a transmission path has an intersection on a transmitter-side and branches to different lengths on a receiver-side), timing adjustment may be performed for signals to be transmitted through each transmission path regarded as one and the same relay device group. Thus, skew of each signal can be suppressed without increase in the scale of the circuit for adjusting the timing.

A synchronization signal for synchronizing signals in each relay device group may be transmitted in the form of either a frame signal FR or a clock signal CLK.

When synchronization is established by transmitting the frame signal FR, a PLL for generating the clock signal CLK may be disposed either before or after the delay is changed by a variable delay circuit.

In addition, the timing adjustment circuit may be provided in either a transmitter-side LSI or a receiver-side LSI or in the both.

When the timing between the synchronization signal such as the frame signal FR and data signals DATA is adjusted, synchronization may be established by delaying the synchronization signal with respect to the data signals DATA, or synchronization may be established by delaying the data signals DATA with respect to the synchronization signal.

As described above, in a signal transmission system according to the invention, even if transmission timing in one signal transmission path differs from that in another signal transmission path, signal transmission can be performed with accurate timing by adjusting the timing for each relay device group constituting one and the same signal transmission path.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A signal transmission system comprising:
    a transmitter that transmits, for each one of a plurality arrays, a plurality of transmission signals and a synchronization signal synchronous with the plurality of transmission signals;
    a relay device for each of the plurality of arrays that relays the plurality of transmission signals and the synchronization signal of its respective array in parallel; and
    a receiver that receives the relayed transmission signals and synchronization signals, wherein the receiver includes:
    a synchronization signal output circuit for each of the plurality of arrays that receives the relayed synchronization signals and outputs a respective second synchronization signal according to each received synchronization signal;
    a holding circuit for each of the plurality of arrays that can hold the received plurality of transmission signals of its respective array synchronously with the second synchronization signal of its respective array;
    a notification circuit that selects one of plural timings for each relay device and outputs one notice, for each relay device, indicating the selected timing; and
    the transmitter includes a timing adjustment unit that adjusts a transmission timing of the plurality of transmission signals and the synchronization signal for each of the plurality of arrays to be transmitted from the transmitter, based on the respective notices from the notification circuit for each array, so that each of the plurality of transmission signals associated with the same array have the same transmission timing.

2. The signal transmission system according to claim 1, wherein:
    the transmitter further transmits a predetermined test pattern, and the notification circuit transmits a signal that changes the transmission timing of the synchronization signals, which are transmitted together with the test pattern, to the transmitter.

3. The signal transmission system according to claim 1, wherein the notification circuit of the receiver receives, through the relay devices, the synchronous signals transmitted from the transmitter and transmits the received synchronous signals through a second relay device to the transmitter.

4. The signal transmission system according to claim 1, wherein the receiver further comprises a serial to parallel circuit that converts each of the received plurality of transmission signals from a serial signal to a plurality of parallel signals.

5. The signal transmission system according to claim 1, wherein the receiver includes a reception timing adjustment unit that adjusts a reception timing of each of the received plurality of transmission signals based on the relayed synchronization signals.

* * * * *